(12) United States Patent
Ogino et al.

(10) Patent No.: US 10,518,343 B2
(45) Date of Patent: Dec. 31, 2019

(54) PORTABLE MACHINING DEVICE

(71) Applicant: MAKITA CORPORATION, Anjo-shi, Aichi (JP)

(72) Inventors: Yohei Ogino, Anjo (JP); Katsumi Okouchi, Anjo (JP); Hiromu Goto, Anjo (JP); Yuki Wada, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 0 days.

(21) Appl. No.: 15/921,078

(22) Filed: Mar. 14, 2018

(65) Prior Publication Data

US 2018/0290221 A1 Oct. 11, 2018

(30) Foreign Application Priority Data

Apr. 5, 2017 (JP) .................................. 2017-075524

(51) Int. Cl.
*B25F 5/00* (2006.01)
*B27B 5/29* (2006.01)
*B23D 45/16* (2006.01)

(52) U.S. Cl.
CPC ................ *B23D 45/16* (2013.01); *B25F 5/00* (2013.01); *B27B 5/29* (2013.01)

(58) Field of Classification Search
CPC .............. B23D 45/16; B25F 5/00; B27B 5/29
See application file for complete search history.

(56) References Cited

U.S. PATENT DOCUMENTS

| | | | | |
|---|---|---|---|---|
| 4,314,240 A | * | 2/1982 | Schnug ................ | A63B 29/021 340/571 |
| 4,494,433 A | * | 1/1985 | Gerber .................... | B08B 15/00 83/100 |
| 4,587,873 A | * | 5/1986 | Gerber .................... | B08B 15/00 269/21 |
| 4,715,805 A | * | 12/1987 | Nasu ...................... | A41H 15/00 156/382 |
| 4,991,225 A | * | 2/1991 | Holcomb ............. | G08B 3/1058 429/100 |
| 5,219,296 A | * | 6/1993 | Nguyen ............. | H01R 13/6666 439/95 |

(Continued)

FOREIGN PATENT DOCUMENTS

| EP | 2 628 431 A2 | 8/2013 |
|---|---|---|
| EP | 2 735 078 A2 | 5/2014 |

(Continued)

OTHER PUBLICATIONS

Aug. 24, 2018 Extended European Search Report issued in European Patent Application No. 18164864.3.

*Primary Examiner* — Sean M Michalski
(74) *Attorney, Agent, or Firm* — Oliff PLC

(57) ABSTRACT

A communication adapter 31 for conducting radio communication between a portable machining device 1 and a dust collector 40, such that the dust collector 40 may operate synchronously with the portable machining device 1 with respect to a start/stop operation when performing a cutting task is detachably incorporated in a handle 20 of the portable machining device 1. Because of this arrangement, a high level of dust-proof ability as well as ease of maneuverability in attaching and detaching the communication adapter 31 can be achieved.

18 Claims, 14 Drawing Sheets

(56) References Cited

U.S. PATENT DOCUMENTS

| | | | | |
|---|---|---|---|---|
| 5,701,155 A * | 12/1997 | Wood | | A61B 1/04 |
| | | | | 348/72 |
| 5,926,151 A * | 7/1999 | Hagiwara | | H01Q 1/125 |
| | | | | 343/757 |
| 6,042,095 A * | 3/2000 | Kuchta | | A41H 43/0292 |
| | | | | 269/21 |
| 6,072,991 A * | 6/2000 | Paul | | H04B 1/38 |
| | | | | 343/702 |
| 8,857,067 B2 * | 10/2014 | Moreno | | B23D 47/12 |
| | | | | 30/388 |
| 9,215,819 B2 * | 12/2015 | Schnekenburger | | H01Q 1/241 |
| 2008/0244910 A1 * | 10/2008 | Patel | | B23D 45/122 |
| | | | | 30/123 |
| 2008/0306360 A1 * | 12/2008 | Robertson | | A61B 1/00016 |
| | | | | 600/302 |
| 2009/0200367 A1 * | 8/2009 | Arnouse | | G06F 15/02 |
| | | | | 235/375 |
| 2009/0250823 A1 * | 10/2009 | Racz | | H01L 21/6835 |
| | | | | 257/778 |
| 2010/0081400 A1 * | 4/2010 | Takahara | | H01Q 1/243 |
| | | | | 455/127.1 |
| 2010/0186565 A1 * | 7/2010 | Saari | | B08B 15/04 |
| | | | | 83/100 |
| 2011/0227871 A1 * | 9/2011 | Cannon | | A63F 13/02 |
| | | | | 345/174 |
| 2012/0050198 A1 * | 3/2012 | Cannon | | A63H 30/04 |
| | | | | 345/173 |
| 2013/0074669 A1 * | 3/2013 | Swopes | | B26D 3/16 |
| | | | | 83/76.9 |
| 2013/0081280 A1 * | 4/2013 | Moreno | | B23D 59/006 |
| | | | | 30/124 |
| 2013/0308265 A1 * | 11/2013 | Arnouse | | H05K 7/1488 |
| | | | | 361/679.41 |
| 2013/0322832 A1 * | 12/2013 | Wang | | G02B 6/4261 |
| | | | | 385/92 |
| 2014/0151079 A1 * | 6/2014 | Furui | | B25F 5/02 |
| | | | | 173/46 |
| 2014/0208600 A1 * | 7/2014 | Moreno | | B25F 5/001 |
| | | | | 30/388 |
| 2014/0240125 A1 * | 8/2014 | Burch | | G08B 21/0213 |
| | | | | 340/539.13 |
| 2014/0304939 A1 | 10/2014 | Suzuki | | |
| 2015/0020670 A1 * | 1/2015 | Wakita | | B27B 5/325 |
| | | | | 83/522.12 |
| 2015/0266201 A1 * | 9/2015 | Nakashima | | B23Q 9/00 |
| | | | | 30/374 |
| 2017/0282346 A1 * | 10/2017 | Valentini | | B24B 23/028 |

FOREIGN PATENT DOCUMENTS

| | | |
|---|---|---|
| EP | 3 028 810 A1 | 6/2016 |
| EP | 3 189 941 A1 | 7/2017 |
| JP | 2004-195565 A | 7/2004 |

\* cited by examiner

PORTABLE MACHINING DEVICE

CROSS-REFERENCE

This application claims priority to Japanese patent application serial number 2017-075524, filed on Apr. 5, 2017, the contents of which are incorporated herein by reference in their entirety.

TECHNICAL FIELD

The present disclosure generally relates to a portable machining device and/or a portable machining tool such as, for example, a portable cutting device used for cutting a material to be cut (workpiece) such as wooden material, etc.

BACKGROUND ART

A conventional portable machining device generally includes, for example, a base that contacts an upper surface of the workpiece, as well as a machining device main body that is supported on an upper surface side of the base so as to be movable in an up-to-down direction. The machining device generally includes an electric motor, as well as a cutting blade that can be rotatably driven with the electric motor serving as a driving force. By moving the machining device main body in the up-to-down direction with respect to the base, the machining device can be positioned between a cutting position in which the cutting blade protrudes below a lower surface of the base and a retreat position in which the cutting blade retreats in the upward direction with respect to the lower surface of the base. With the rotation of the cutting blade that protrudes below the lower surface of the base and the movement of the machining device with respect to the workpiece, a cutting task can be performed. A cutting blade cover that covers approximately the circumferential periphery of the cutting blade may be provided on the upper surface of the base. An exposed lower portion of the cutting blade that protrudes in the downward direction from the cutting blade cover can cut into the workpiece. The upper periphery of the blade in the cutting position can be covered by the cutting blade cover, which prevents cutting dust from scattering around.

In some types of portable machining devices developed in the past, a dust collector for collecting cutting dust generated by a cutting task is used as an incidental device. For example, Japanese Laid-Open Patent Publication No. 2004-195565 discloses a portable machining device relating to a dust collector serving as the incidental device, in which radio communication can be conducted between the portable machining device and the dust collector, where said communication can be automatically stopped by a stop operation of the portable machining device.

However, in the portable machining device disclosed in the above-discussed Patent Publication, a communication adapter used in conducting radio communication is exposed to the outside. As a result, the dustproof ability of the device against cutting dust is substantially inadequate and is a deficiency in need of improvement.

Thus, as a result of the mentioned deficiencies in the art, there is a need to improve the extent to which the communication adapter in the portable machining device is dustproof, where said device includes the communication adapter for conducting radio communication between the portable machining device and the incidental device such as the dust collector.

SUMMARY

In one exemplary embodiment of the present disclosure, a portable machining device comprises a base with which a material to be cut is brought into contact, a machining device main body that is supported above an upper surface of the base, and a handle that is formed integrally with the machining device main body. Furthermore, the machining device main body includes a rotary cutting blade that is rotated by an electric motor serving as a drive source, the cutting blade being able to protrude below a lower surface of the base such that a protruding portion of the cutting blade can perform a cutting task by cutting into a material to be cut. Furthermore, an adapter for conducting radio communication with an incidental device of the portable machining device is detachably provided in the interior of the machining main body, and the incidental device is started and stopped in a synchronous manner with the corresponding start and stop operations of the portable machining device.

According to the embodiment, the adapter for conducting radio communication is provided in the interior of the machining device main body. Because it is provided in the interior, the dustproof ability of the adapter can be substantially increased as compared to the case where the adapter is outside. Furthermore, the adapter is removably attached to the machining device main body, and accordingly in a case where the radio communication is not performed, the adapter can be easily removed from the machining device, and can be used in another device. In this respect, usability as well as versatility of the adapter and by consequence that of the radio communication function and the portable machining device as a whole can be improved.

In another exemplary embodiment of the disclosure, the adapter for conducting radio communication is disposed above the electric motor.

According to such an embodiment, information about the start/stop status of the electric motor etc. can be accurately transmitted to the adapter and thus reliability of the radio communication function can be improved.

In another exemplary embodiment of the disclosure, the adapter for conducting radio communication may be removed from the device main body by moving the adapter in a direction away from the cutting blade.

According to such an embodiment, removing and attaching operability of the adapter can be improved.

In another exemplary embodiment of the disclosure, the adapter for conducting radio communication is disposed at a front portion of the handle.

According to such an embodiment, the maneuverability and ease of use in removing and attaching the adapter can be furthermore improved.

In another exemplary embodiment of the disclosure, a controller for controlling radio communication is disposed over the electric motor.

According to such an embodiment, by being placed over the motor, the dustproof ability and cooling ability with respect to the controller can be established to the same level as the electric motor.

In another exemplary embodiment of the disclosure, the adapter is disposed at a lateral side of the handle on a side of the motor so as to be close in a direction right above the electric motor.

According to such an embodiment, since the adapter for conducting radio communication is disposed in the vicinity above and immediately proximate to the electric motor, information on the start/stop status of the electric motor etc.

can be accurately transmitted to the incidental device and thus reliability of the radio communication function can be improved.

In another exemplary embodiment of the disclosure, a controller for controlling the radio communication is housed at the rear of the handle.

According to such an embodiment, the controller can be arranged in a compact manner by, for example, utilizing a battery attachment portion, as well as providing a substantially dustproof environment for the controller.

DETAILED DESCRIPTION

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, these specific details refer to well-known structures, components and/or devices that are shown in block diagram form in order to avoid obscuring significant aspects of the exemplary embodiments presented herein.

Representative, non-limiting embodiments according to the present disclosures will be described with reference to FIGS. 1 to 14. FIGS. 1 to 5 show a first embodiment of the present disclosure. In the first embodiment, a cutting device (circular saw) that a user can hold and move in a cutting proceeding direction for perform a cutting task is exemplified as an example of a portable machining device 1. In the following embodiments, the front and rear directions of members and configurations are based relative to the cutting proceeding direction as described above. The user may be situated on the rear side of the portable machining device 1, wherein the leftward and rightward are determined based on the user's position.

Figure 2:
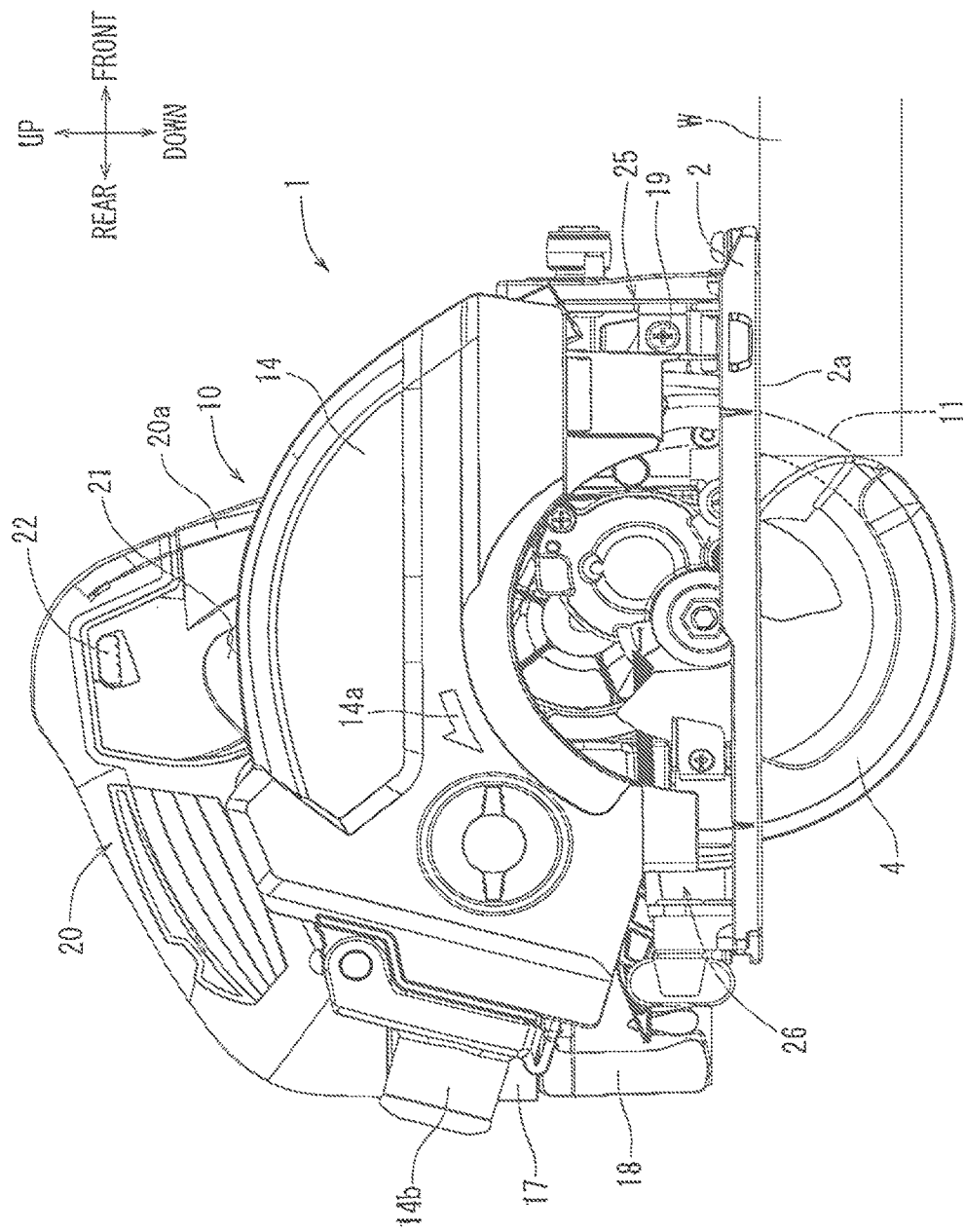
FIG. 2 is a right side view of the portable machining device according to the exemplary embodiment (first embodiment).

Generally, the portable machining device 1 may be provided with a base 2 that is brought into contact with a material to be cut (workpiece) W as well as a machining device main body 10 that is supported above an upper surface of the base 2. The base 2 may have an approximately rectangular flat-plate shape. A lower surface of the base 2 on its underside may be a contact surface 2a that is brought into contact with the workpiece W. The machining device main body 10 may be supported on the upper surface side of the base 2 so as to be swingable in the up-to-down direction. As shown in FIG. 2, the machining device main body 10 may be supported on the front side of the base 2 so as to be swingable in the up-to-down direction about a main body support shaft 19. Furthermore, the machining device main body 10 may also be supported such that it can be tilted in the left-to right direction via a front support portion 25 and a rear support portion 26. By changing the up-to-down position of the machining device main body 10 that is swung about the main body support shaft 19, the protruding length of a cutting blade 11 that protrudes below the lower surface of the base 2 can be adjusted. Because of this configuration, the cutting depth of the cutting blade 11 with respect to the workpiece W can be changed. Furthermore, by tilting the machining device main body 10 in the leftward or rightward direction via the front support portion 25 and the rear support portion 26, the cutting blade 11 can be used to perform an oblique cut into the workpiece W.

Figure 1:
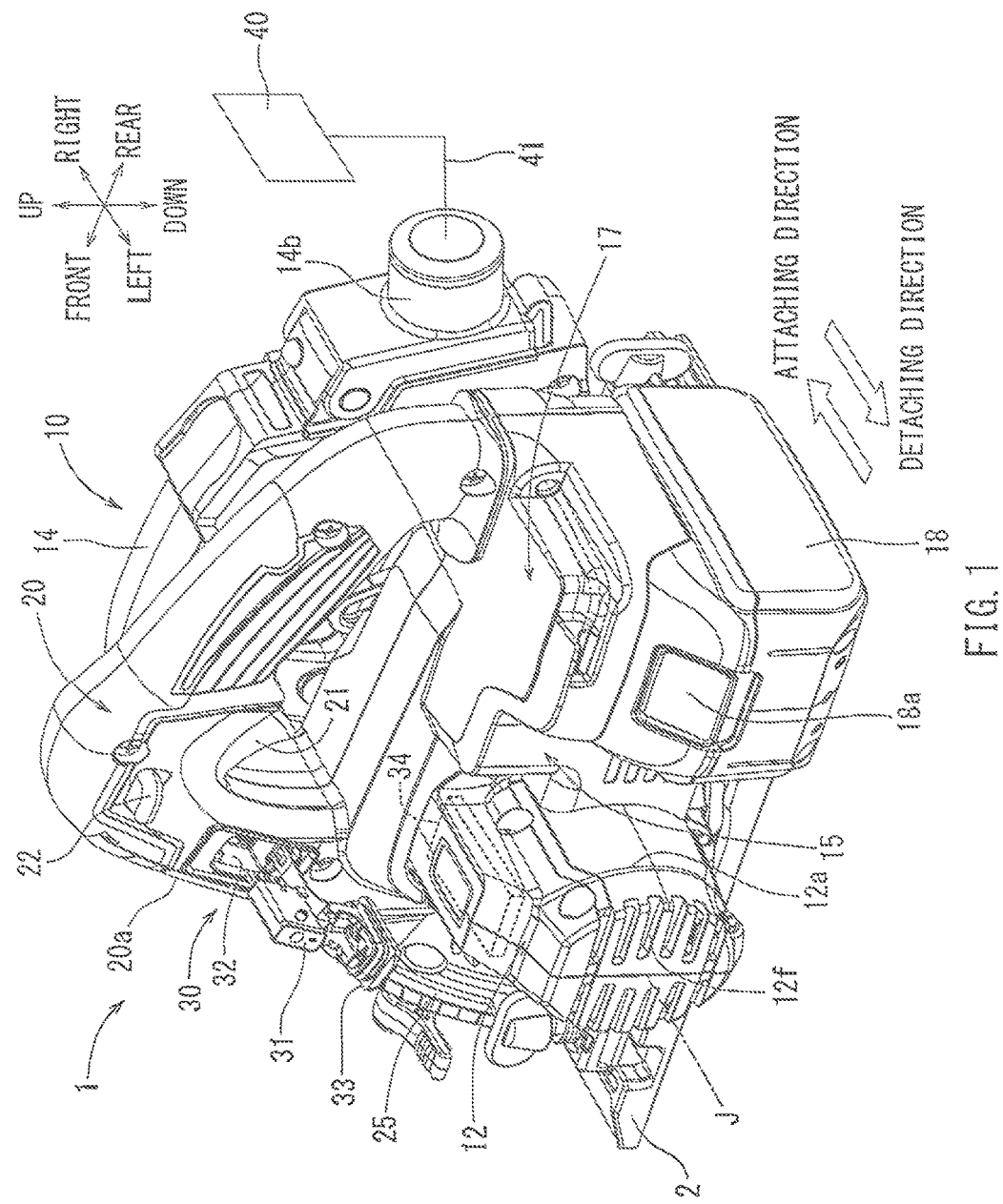
FIG. 1 is an overall perspective view of a portable machining device according to an exemplary embodiment (first embodiment) of the present disclosure, seen from a rear upper left.

A cutting blade cover 14 may cover approximately the upper semi-circular half of the circumference of the cutting blade 11. Cutting dust generated by the cutting task of the workpiece W may be mostly blown out within the cutting blade cover 14. As shown in FIG. 2, an arrow 14a indicating the rotational direction of the cutting blade 11 is labeled on the right side of the cutting blade cover 14. Referring to FIG. 2, by rotation of the cutting blade 11 in the counterclockwise direction as indicated by arrow 14a, cutting dust may be blown out at the front side of the cutting blade cover 14. Cutting dust that is blown out in this manner may flow to the rear side of the cutting dust cover 14 along with airflow generated by rotation of the cutting blade 11. As shown in FIG. 1, a dust collection hose 41 of a dust collector 40 can be connected to a dust collection port 20a in place of a dust collection bag or a dust collection box.

A movable cover 4 may cover approximately the lower semi-circular half of the circumference of the cutting blade 11. The movable cover 4 may be supported so as to be opened/closed along the outer circumferential periphery of the cutting blade 11. As shown in the figures, the movable cover 4 may be brought into contact with, for example, an end of the workpiece W to relatively rotate in an opening clockwise direction, when the device progresses frontwards against the workpiece W.

Figure 5:
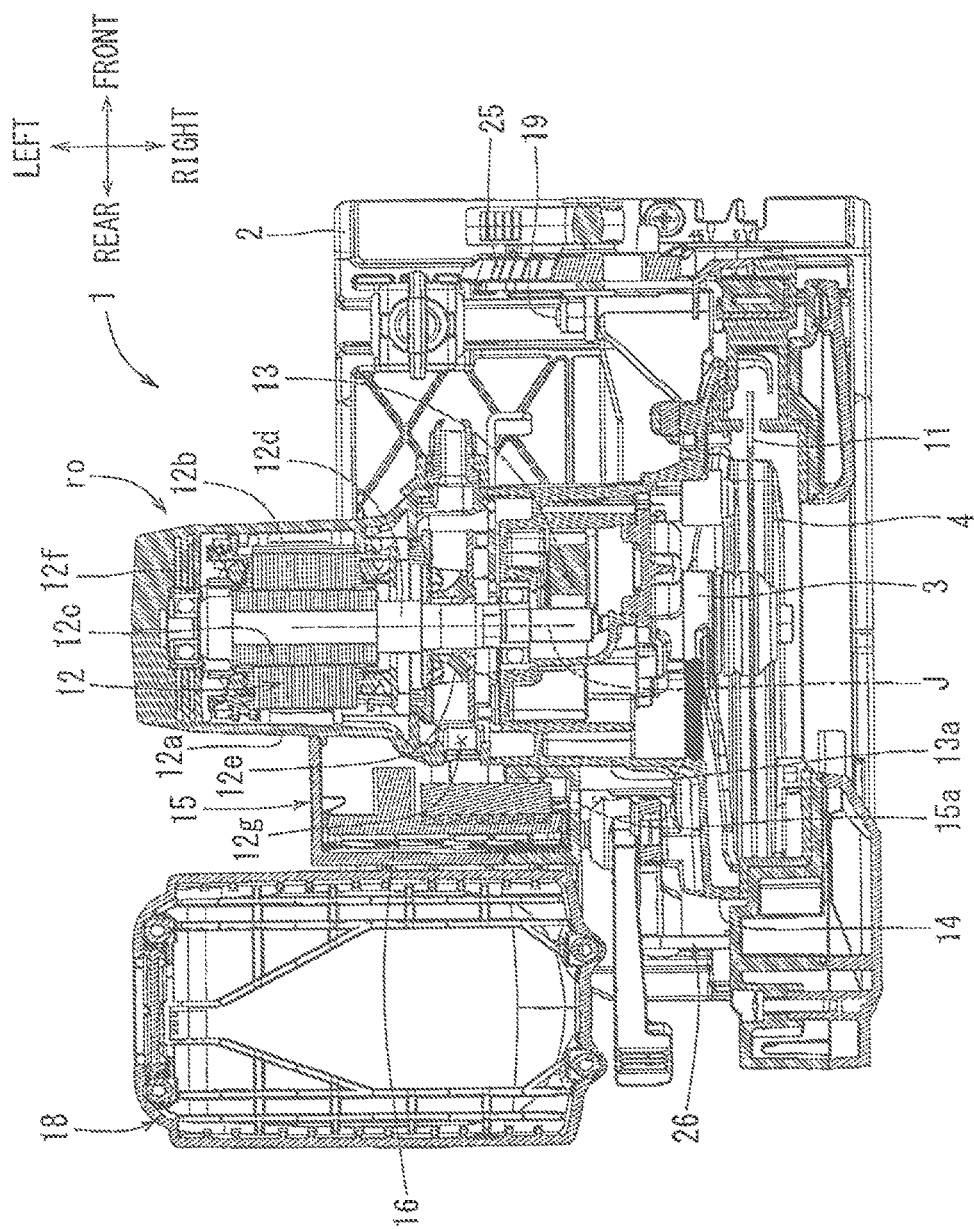
FIG. 5 is an overall lateral cross-sectional view of the portable machining device according to the exemplary embodiment (first embodiment).

As shown in FIG. 5, an electric motor 12 may be joined to the left surface side of the cutting blade cover 14 while a reduction gear portion 13 is disposed in between the electric motor 12 and the cutting blade cover 14 in the left-to-right direction. The electric motor 12 may be provided with a stator 12b that is fixed to a motor case 12a as well as a rotor 12c that is rotatably supported on an inner circumference side of the stator 12b via a motor shaft 12d.

Rotation power of the electric motor 12 may be output to a spindle 3 via the reduction gear portion 13. The spindle 3 may protrude into an inner side of the cutting blade cover 14 and the circular cutting blade 11 may be screw-fixed to said inner protruding portion of the spindle 3.

A cooling fan 12e may be attached to the motor shaft 12d of the electric motor 12. A plurality of intake holes 12f may be provided on the left surface of the motor case 12a. When the electric motor 12 is driven and the cooling fan 12e rotates, outside air may be introduced into the motor case 12a via the intake holes 12f. Outside air (motor cooling air) introduced into the motor case 12a may flow in the rightward direction, which can cool the stator 12b and rotor 12c, etc.

Figure 3:
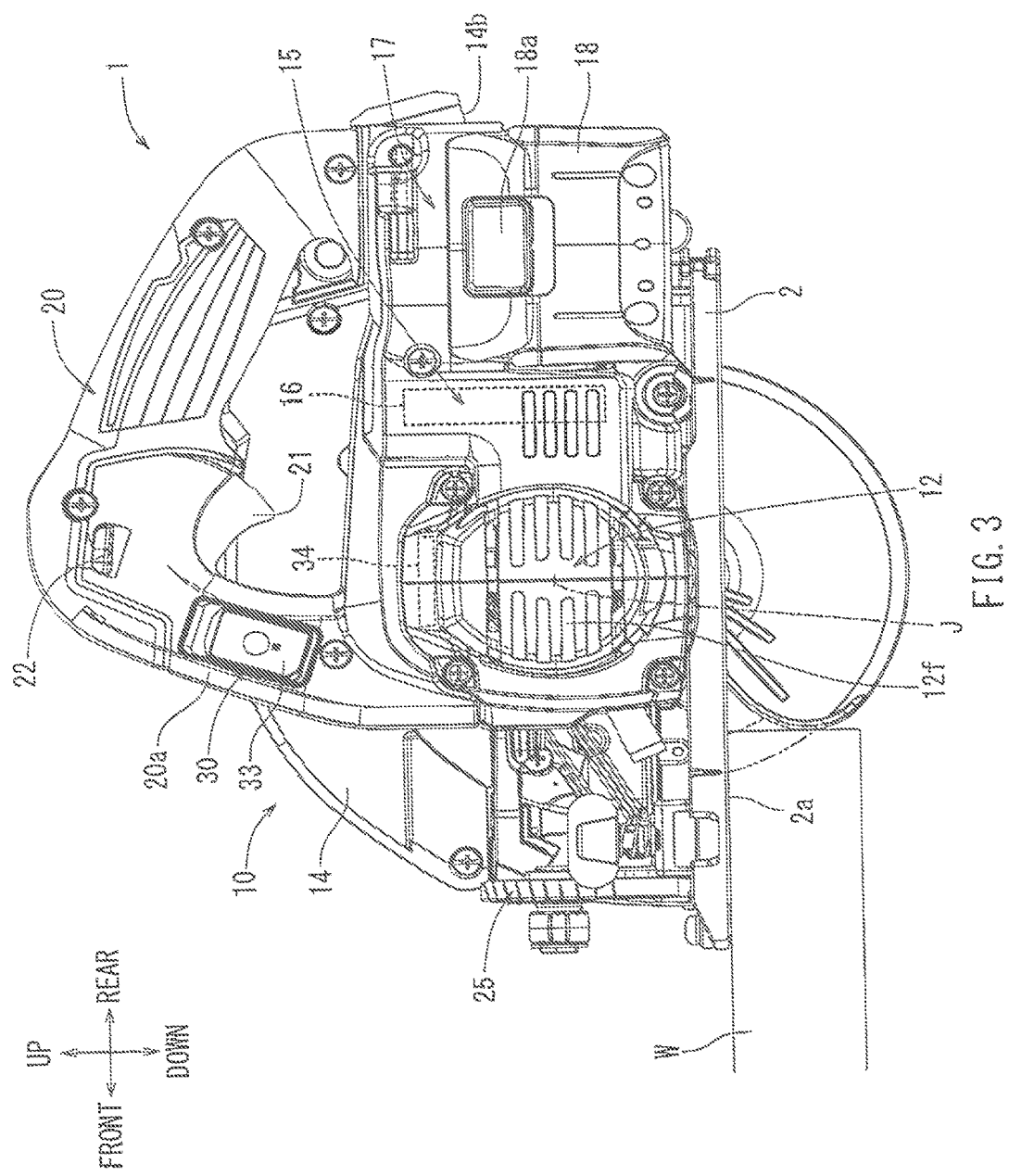
FIG. 3 is a left side view of the portable machining device according to the exemplary embodiment (first embodiment).
Figure 4:
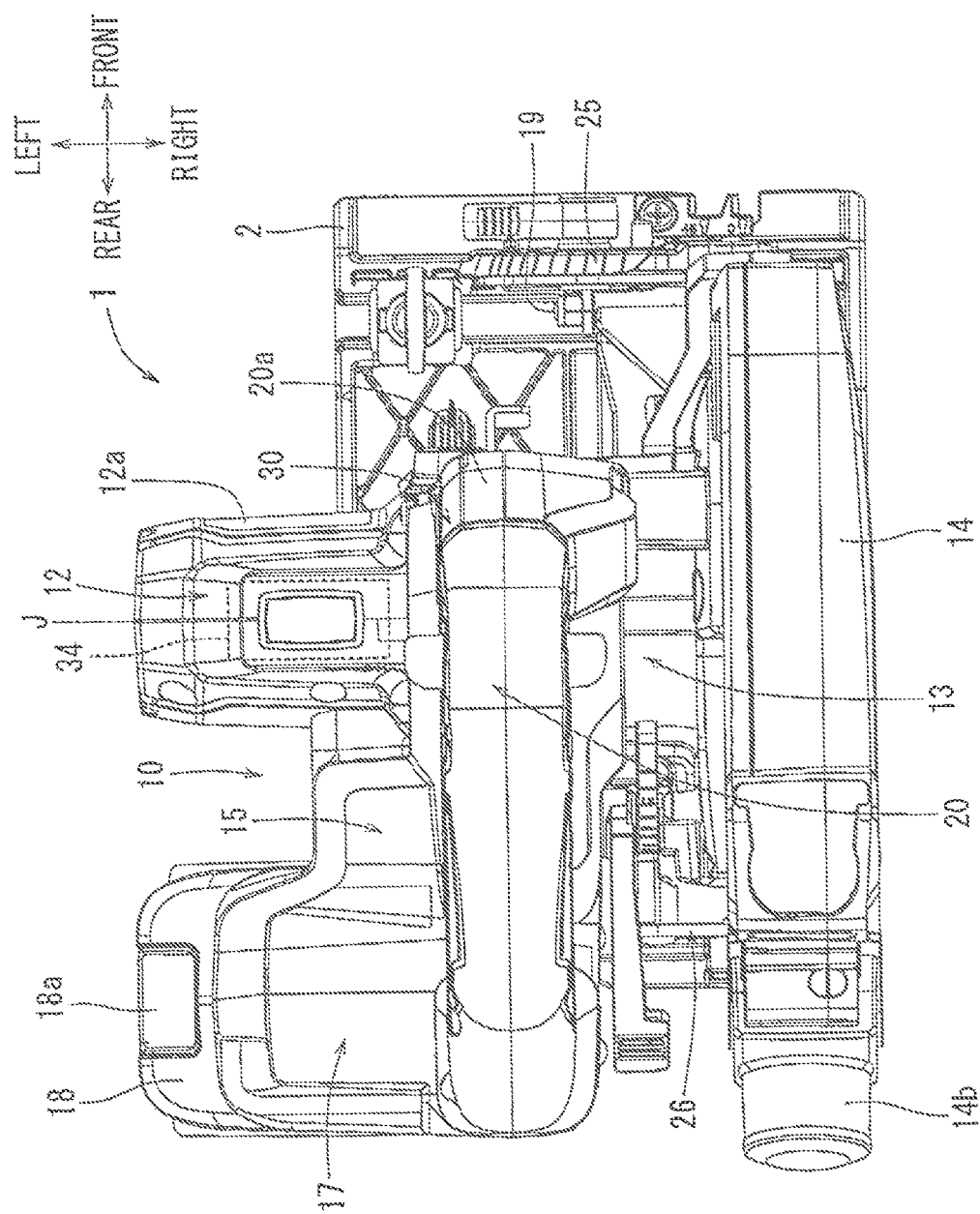
FIG. 4 is an overall plan view of the portable machining device according to the exemplary embodiment (first embodiment).

A controller housing 15 may be provided behind the electric motor 12. The controller housing 15 may house a controller 16 having a rectangular flat-plate shape. The controller 16 may house a control circuit board in a case having a shallow bottom and the interior of the case may be resin molded. In this embodiment, the controller 16 may be housed in the controller housing 15 such that a width direction of the controller 16 corresponds to the front-to-rear direction of the device and the controller 16 is disposed approximately in an erect manner in the up-to-down direction, as shown in FIG. 3. The controller 16 may include a control circuit for mainly controlling the electric motor 12 and a power supply circuit. In particular, the control circuit may include a microprocessor that transmits a control signal based on positional information of the rotor 12c that is detected by a sensor PCB mounted on the electric motor 12. Furthermore, the controller 31 may also include a drive circuit composed of FETs that switches and/or adjusts the current of the electric motor 12 based on the control signal received from the control circuit. Furthermore, the controller 31 may also include an auto-stop circuit that interrupts power supply to the electric motor 12 based on a detection result from the battery pack 18 in order to prevent over-discharging and current overload conditions.

The interior of the controller housing 15 may be in fluid communication with an interior of the motor case 12a via a ventilation hole 12g. The ventilation hole 12g may be provided on a lateral side of the cooling fan 12e. Because of this configuration, motor cooling air generated by rotation of the cooling fan 12e may flow outwards from the motor case 12a into the controller housing 15 via the ventilation hole 12g. Motor cooling air flowing into the control housing 15 may cool the controller 16. After that, motor cooling air may be directed to the exterior of the controller housing 15 through an exhaust hole 15a provided on the right side of the controller housing 15.

A flat-plate shaped battery attachment portion 17 may be provided on the rear side of the controller housing 15 so as to extend in the rearward direction. A battery pack 18 may be attached to a lower surface of the battery attachment portion 17.

The battery pack 18 may be a lithium ion battery within which a plurality of battery cells may be incorporated in a battery case having an approximately hexahedral shape. The battery pack 18 may be highly versatile such that it can be attached to other power tools, serving as a power source for electric power tools other than the portable machining device 1. FIG. 5 shows a cross-section of a battery pack 18. The battery pack 18 may be of a slide-attachment type and may be attached to the battery attachment portion 17 by being slid in the rightward direction as shown by the void arrow of FIG. 1 depicting the attaching direction. Conversely, the battery pack 18 may be detached from the battery attachment portion 17 by sliding the battery pack 18 in the leftward direction while an unlock button 18a for removal is concomitantly pressed down. The detached battery pack 18 can be charged by a dedicated battery charger, such that it can be repeatedly used.

A handle 20 that the user holds may be provided on an upper side of the electric motor 12. The handle 20 may have a loop shape straddling the upper surface of the electric motor case 12a as well as the upper surface of the battery attachment portion 17. A switch lever 21 which may be pulled inwards by a user's fingertips may be provided on the inner circumference of the handle 20. Furthermore, a lock-off lever 22 for locking the switch lever 21 to an off position may be provided above the switch lever 21. The lock-off lever 22 can be operated on both the left side and the right side thereof. The switch lever 21 can be pulled while the lock-off lever 22 is simultaneously being pulled down by the user's finger. In this manner, the lock-off lever 22 can prevent the switch lever 21 from accidentally being pulled.

An erection portion 20a may be provided at the front of the handle 20 extending from the upper surface of the motor case 12a of the electric motor 12 in the upward direction. A radio communication unit 30 for conducting radio communication between the portable machining device 1 and incidental devices may be provided on the left side of the erection portion 20a (towards the upper side of the electric motor 12), as shown in FIG. 1. Furthermore, as shown in FIG. 3, the radio communication unit 30 may be situated over the electric motor 12 (approximately right above the electric motor), as viewed in a direction of the left-to-right motor axis J, in the plane comprising the up-to-down and left-to-right directions, in a case where the machining device main body 10 is moved to a lower end position and the cutting depth of the cutting blade 11 with respect to the workpiece W protruding below contact surface 2a is set to its maximum. In this way, the radio communication unit 30 may be disposed at a lateral side of the handle 20 on a side of the electric motor 12 so as to be over the electric motor 12 or to be close in a direction right above the electric motor 12. In other words, the radio communication unit 30 may be disposed in the vicinity of and immediately proximate to the electric motor 12. In this embodiment, the radio communication unit 30 may be provided for conducting radio communication between the portable machining device 1 and a dust collector 40 serving as the incidental device. By conducting radio communication between the portable machining device 1 and the dust collector 40 via the radio communication unit 30, the dust collector 40 may operate synchronously with the portable machining device 1 with regard to a start/stop operation of the dust collector 40, etc.

The radio communication unit 30 may be provided with a communication adapter 31. The communication adapter 31 may be inserted into an adapter insertion portion 32 that is provided on the left side of the erection portion 20a. The adapter insertion portion 32 may be a rectangular hole with rounded edges formed deep into the interior of the handle 20 in the rightward direction. Upon insertion of the communication adapter 31 into the adapter insertion portion 32, the communication adapter 31 may be electrically connected with a radio communication controller 34. The radio communication controller 34 may be housed at an upper region in the interior of the motor case 12a. The adapter insertion portion opening 32 may be covered by a cap 33. By inserting the communication adapter 31 into the adapter insertion portion 32 and thereafter closing the cap 33, the communication adapter 31 and the adapter insertion portion 32 may be adequately covered and resistant to dust.

The communication adapter 31 may have been previously associated (paired) with a communication adapter of the specific dust collector 40 such that the radio communication can be performed between the two, for example before being inserted into adapter insertion portion 32. In a state where the communication adapter 31 is attached to the radio communication unit 30, when the switch lever 21 is switched on to run (start) the portable machining device 1, the start information of the portable machining device 1 may be transmitted to the dust collector 40, through radio communication conducted by communication adapter 31, based on which the dust collector 40 may automatically run. As shown in FIG. 1, by attaching the dust collection hose 41 to the dust collection port 14b, the dust collector 40 may be an incidental device of the portable machining device 1, and the dust collector 40 may be in a standby state when powered on.

As discussed above, the portable machining device 1 may be provided with radio communication functionality to communicate with the dust collector 40 as the incidental device with regard to start and stop operations, etc. Accordingly, the dust collector 40 may automatically start/stop in accordance with a start/stop operation of the portable machining device 1, which can furthermore improve operability, maneuverability, and ease of use of both the portable machining device 1 and the dust collector 40.

According to the portable machining device 1 of the first embodiment as discussed above, the communication adapter 31, which is previously associated (paired) with the dust collector 40 serving as the incidental device with regard to the start/stop operation thereof, may be configured to be removably housed in the erection portion 20a of the handle 20. Because of this configuration, the dustproof ability as well as convenience of the communication adapter 31 can be improved. When there is no need to perform the radio communication with the dust collector 40, the communication adapter 31 can be easily removed from the portable machining device 1. In this respect, communication adapter 31 improves convenience for the user.

Furthermore, the radio communication unit 30 may be provided on the left side of the erection portion 20a (on a side of the electric motor 12) so as to be over the electric motor 12 or to be close in a direction right above the electric motor 12, i.e., so as to be disposed in the vicinity of and immediately proximate to the electric motor 12. Because of this configuration, information about start/stop status of the electric motor 12 etc. can be accurately and rapidly communicated between the dust collector 40 and the communication adapter 31 as opposed to the case where the radio communication unit is elsewhere and doesn't receive the information properly. In this respect, reliability of the radio communication unit 30 is improved.

Furthermore, the communication adapter 31 may be configured to be removed from the adapter insertion portion 32 by being moved away from the cutting blade 11 in the leftward direction as shown by the void arrow showing the detaching direction in FIG. 1. Because of this configuration, attaching and detaching operability of the communication adapter 31 can be improved.

The embodiment discussed above may be further modified without departing from the scope and spirit of the present teachings. FIGS. 6 to 13 show a portable machining device 50 of another embodiment (second embodiment). As shown in FIGS. 6 to 9, the portable machining device 50 may be referred to as a so-called plunge circular saw, which generally includes a base 52 that is brought into contact with an upper surface of a workpiece W as well as a machining device main body 51 that is supported on an upper surface side of the base 52. The base 52 may have an approximately rectangular flat-plate shape. A lower surface of the base 52 may be a contact surface 52a that is brought into contact with the workpiece W. A cutting blade cover 53 may be supported on an upper surface side of the base 52. A front support portion 55 and a rear support portion 56 may be provided on the upper surface of the base 52 at a forward position and a rearward position, respectively. The front support portion 55 and the rear support portion 56 may be provided parallel to each other in an erected manner. The cutting blade cover 53 may be supported so as to be tiltable in the left-to-right direction via the front support portion SS end the rear support portion 56.

Figure 8:
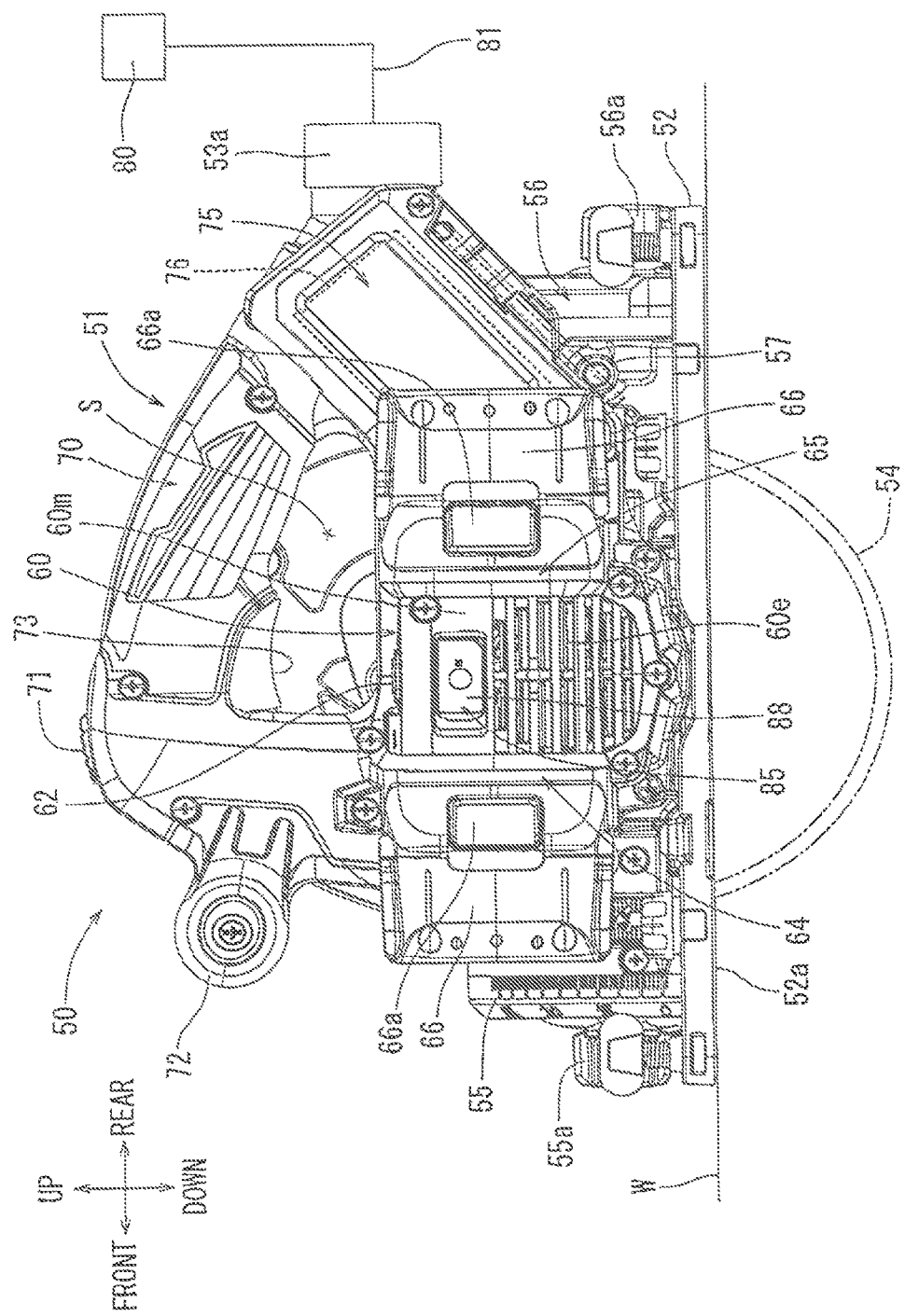
FIG. 8 is a left side view of the portable machining device according to another embodiment (second embodiment).
Figure 11:
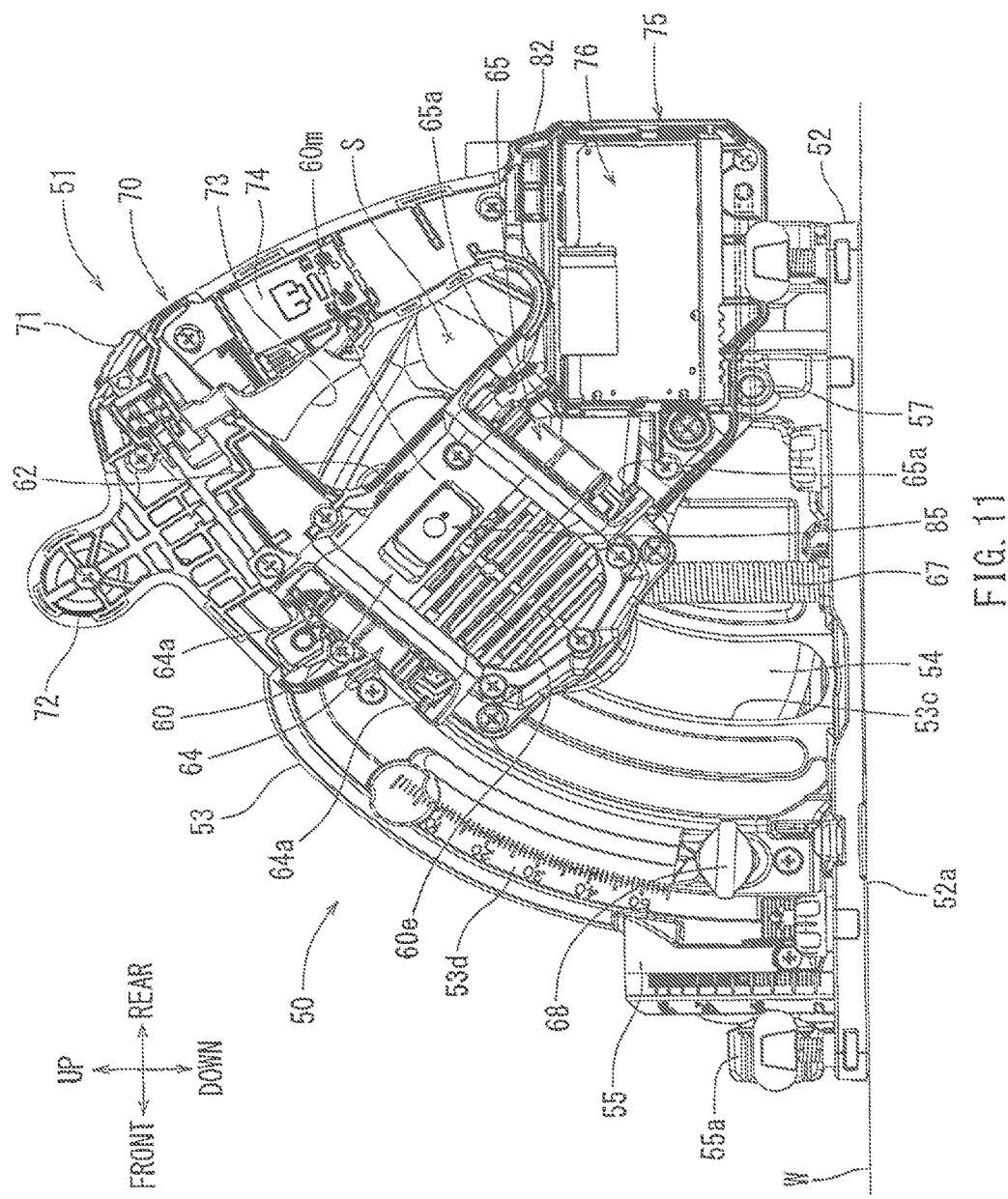
FIG. 11 is a left side view of the portable machining device according to another embodiment (second embodiment), showing a state where a machining device main body is situated at an upper end position.

A rear portion of the machining device main body 51 may be supported on a left side of the cutting blade cover 53 via a main body support shaft 57 about which that the machining device main body 51 can be swung in the up-to-down direction. The main body support shaft 57 may be disposed to the rear of the center of rotation, spindle 59 (see FIG. 5) of the cutting blade 54. Thus, the cutting blade 54 may be largely moved in the up-to-down direction within the cutting blade cover 53. The machining device main body 51 may be biased to swing in an upward direction by a compression spring 67 that is interposed between the machining device main body 51 and the cutting blade cover 53. As shown in FIG. 11, the machining device main body 51 may be held at an upper end position (standby position) by the biasing force of the compression spring 67. A lower portion of the cutting blade 54 may protrude below a contact surface 52a of the base 52 in the downward direction when the machining device main body 51 is swung about the main body support shaft 57 in the downward direction against the biasing force of the compression spring 67. FIG. 8 shows a state upon swinging the machining device main body 51 in the downward direction, where the protruding length of the cutting blade 54 below the contact surface 52a of the base 52 reaches its maximum (where the machining device main body 51 reaches a lower end position). By moving the portable machining device 50 in the forward direction while this lowermost protruding state of the cutting blade 54 is being held, the cutting blade 54 can cut into the workpiece W from the blade's front end and a cutting task can be performed. Instead of moving in the forward direction, if the machining device main body 51 is swung in the downward direction while the cutting blade 54 rotates, driven by the driving force of the electric motor 60, the lower portion of the rotating cutting blade 54 may protrude below the contact surface 52a of the base 52 so as to enter downwards into the workpiece W when performing a cut, where said cut is referred to as a plunge cut.

Figure 13:
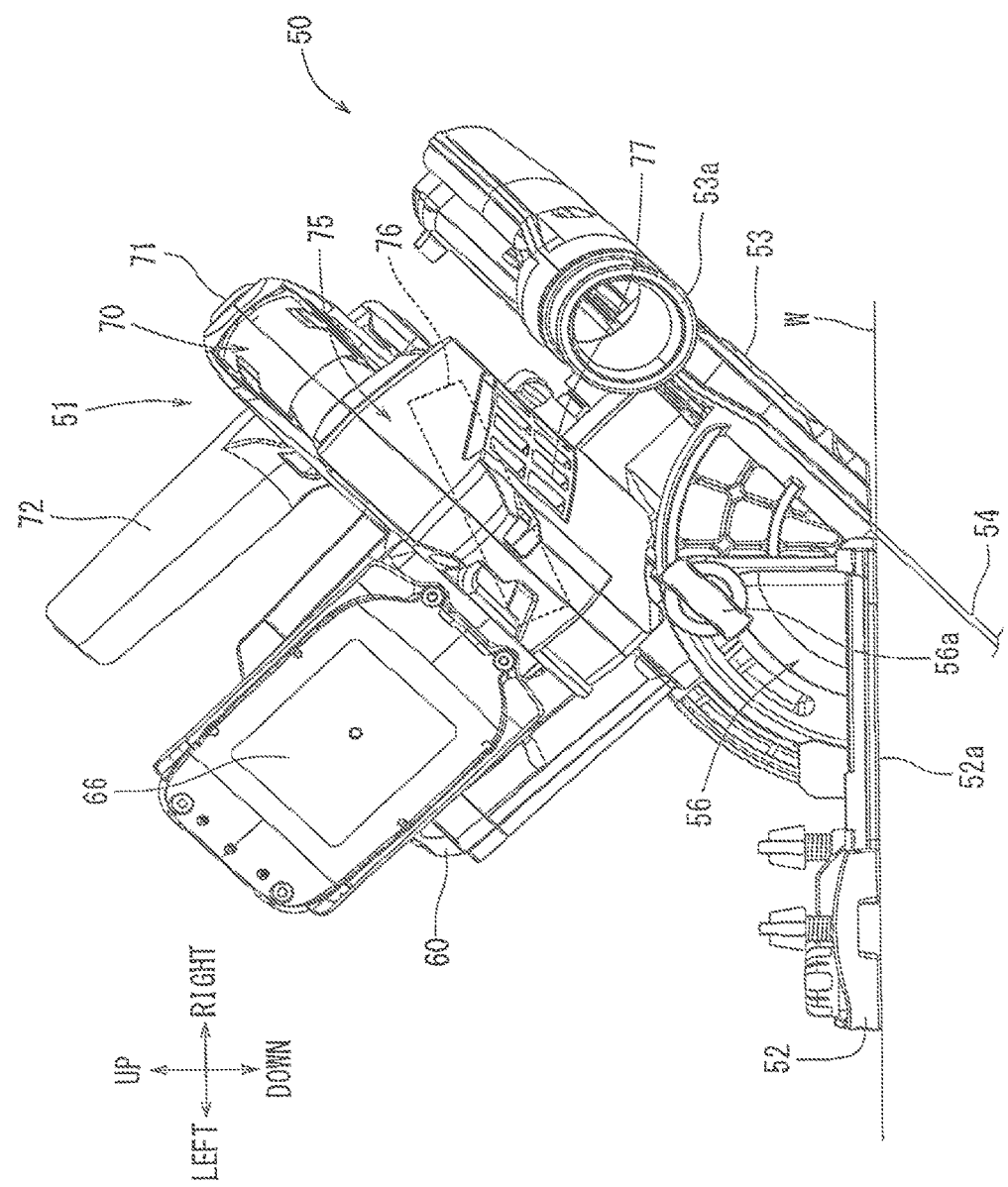
FIG. 13 is a rear side view of the portable machining device according to another embodiment (second embodiment), showing a machining main body is moved to a lower end position and an upper portion thereof is tilted in a rightward direction.

The machining device main body 51 may be supported by the cutting blade cover 53 that in turn can be maneuvered to tilt in the left-to-right direction via the front support portion 55 and the rear support portion 56. Because of this configuration, the cutting blade 54 within the cutting blade cover 53 can also consequently be tilted with respect to the base 52 in the left-to-right direction. FIG. 13 shows a state where the machining device main body 51 is tilted in the rightward direction by approximately 45°. By tilting the cutting blade 54 in the leftward/rightward direction, the portable machining device 50 can be used to perform an oblique cut into the workpiece W (bevel cutting). A tilt angle of the cutting blade cover 53, and in turn that of the cutting blade 54 within the cutting blade cover 53 may be indicated and measured by lines demarcating angles on an angle scale provided on the front support portion 55 (see FIG. 11). A tilt position of the cutting blade cover 53, and by consequence that of the cutting blade 54, with respect to the base 52 can be adjusted as desired to a particular angle by fastening the fixing screws 55a, 56a.

Figure 6:
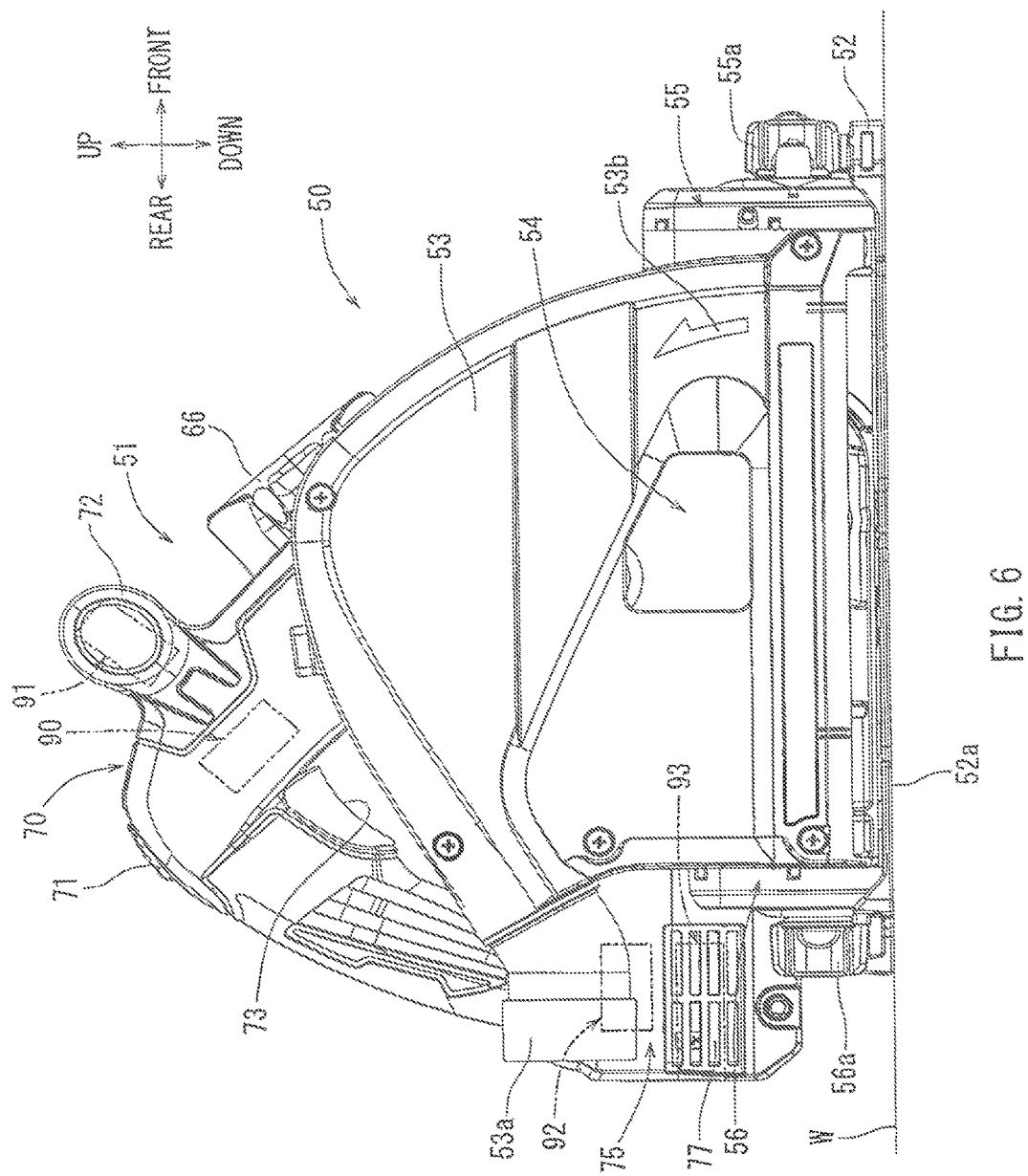
FIG. 6 is a right side view of a portable machining device according to another exemplary embodiment (second embodiment).

The cutting blade cover 53 may cover the upper region of the cutting blade 54 above the contact surface 52a, which prevents cutting dust from scattering. A dust collection port 53a used for connecting a dust collection hose or a dust collection box may be provided at the rear of the cutting blade cover 53. As a result, cutting dust blown out in the proximity of a cutting position (cut-out position by the cutting blade 54), where said dust is generated by rotation of the cutting blade 54 and contact with a workpiece W, may flow in the rearward direction, and consequently said cutting dust may be collected through the dust collection port 53a. As shown in FIG. 6, an arrow 53b showing the rotation direction of the cutting blade 54 may be indicated on the right surface side of the cutting blade cover 53.

A swing position (swing angle) of the machining device main body 51 can be fixed to a lower end position or an arbitrary position during a swing operation so as to not be further movable in the downward direction by fastening a fixing screw 68 provided on the left surface side of the cutting blade cover 53. The fixing screw 68 is shown in FIG. 11. By adjusting the swing position of the machining device main body 51 and fixing the swing position in the up-to-down direction by using the fastening screw 68, the protruding length of the cutting blade 54 below the contact surface 52a can thereby be fixed to an arbitrary and/or predetermined length. Because of this adjustment, the cutting depth of the cutting blade 54 with respect to the workpiece W can be adjusted and fixed to an arbitrary and/or predetermined length. As shown in FIG. 11, a cutting depth scale 53d for indicating the cutting depth of the cutting blade 54 may be provided on the left surface side of the cutting blade cover 54.

Figure 9:
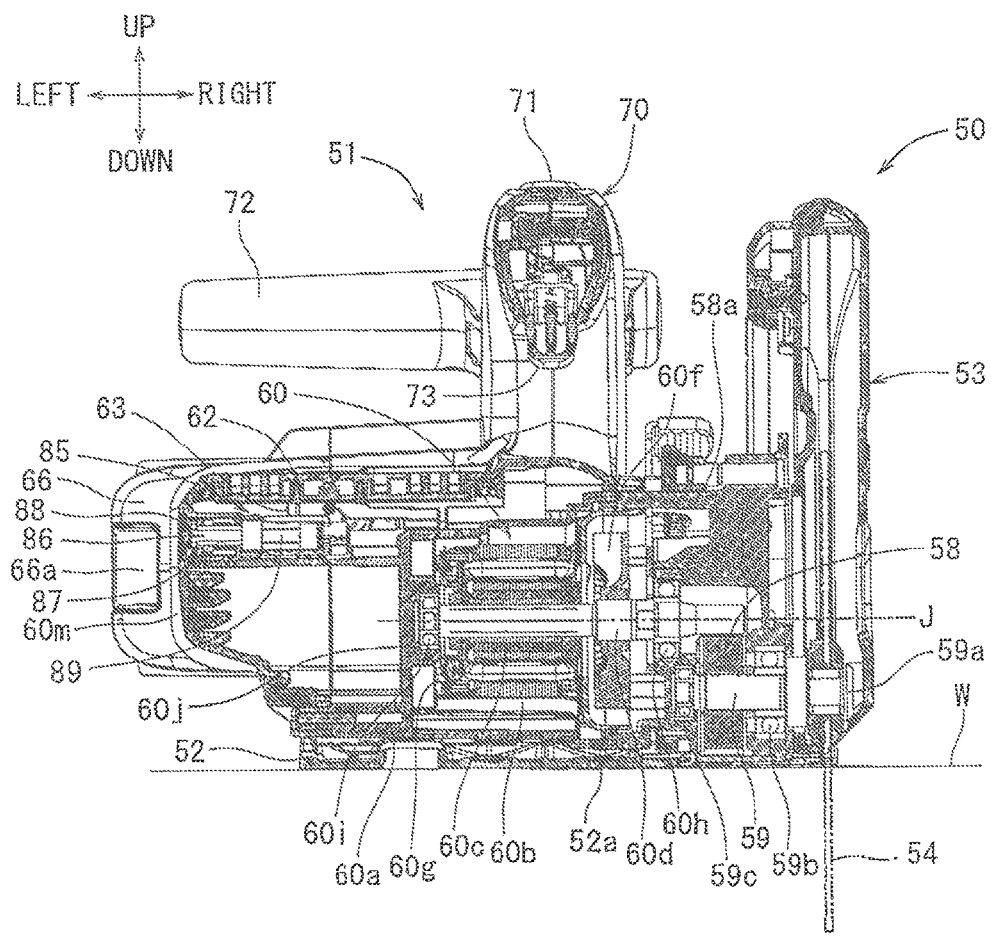
FIG. 9 is a longitudinal cross-sectional view of the portable machining device according to another embodiment (second embodiment), seen from a rear side.

As shown in FIG. 9, the machining device main body 51 may be provided with the electric motor 60 that serves as the driving source for and rotates the cutting blade 54. The machining device main body 51 may also be provided with a reduction gear portion 58 that houses a reduction gear train for decreasing rotation output of the electric motor 12 in a gear case 58a, and a handle 70 that a user holds. The electric motor 60 may be connected to the left side of the reduction gear portion 58.

A DC brushless motor that is powered by a battery pack 66 (DC power source) serving as a power source can be used as the electric motor 60. The electric motor 60 may be provided with a stator 60b that is fixed to a motor case 60a as well as a rotor 60c that is rotatably supported on an inner circumference of the stator 60b. A sensor PCB 60g including an electromagnetic sensor for detecting a rotation position of the rotor 60c may be attached to the rear surface (left surface) of the stator 60b in a direction of a motor axis J. A motor shaft 60d that is joined to the rotor 60c may be rotatably supported around the motor axis J via a right bearing 60h and a left bearing 60i. The right bearing 60h may be held in the gear case 58a and the left bearing 60i may be held in an intermediate partition wall 60j of the motor case 60a.

Figure 12:
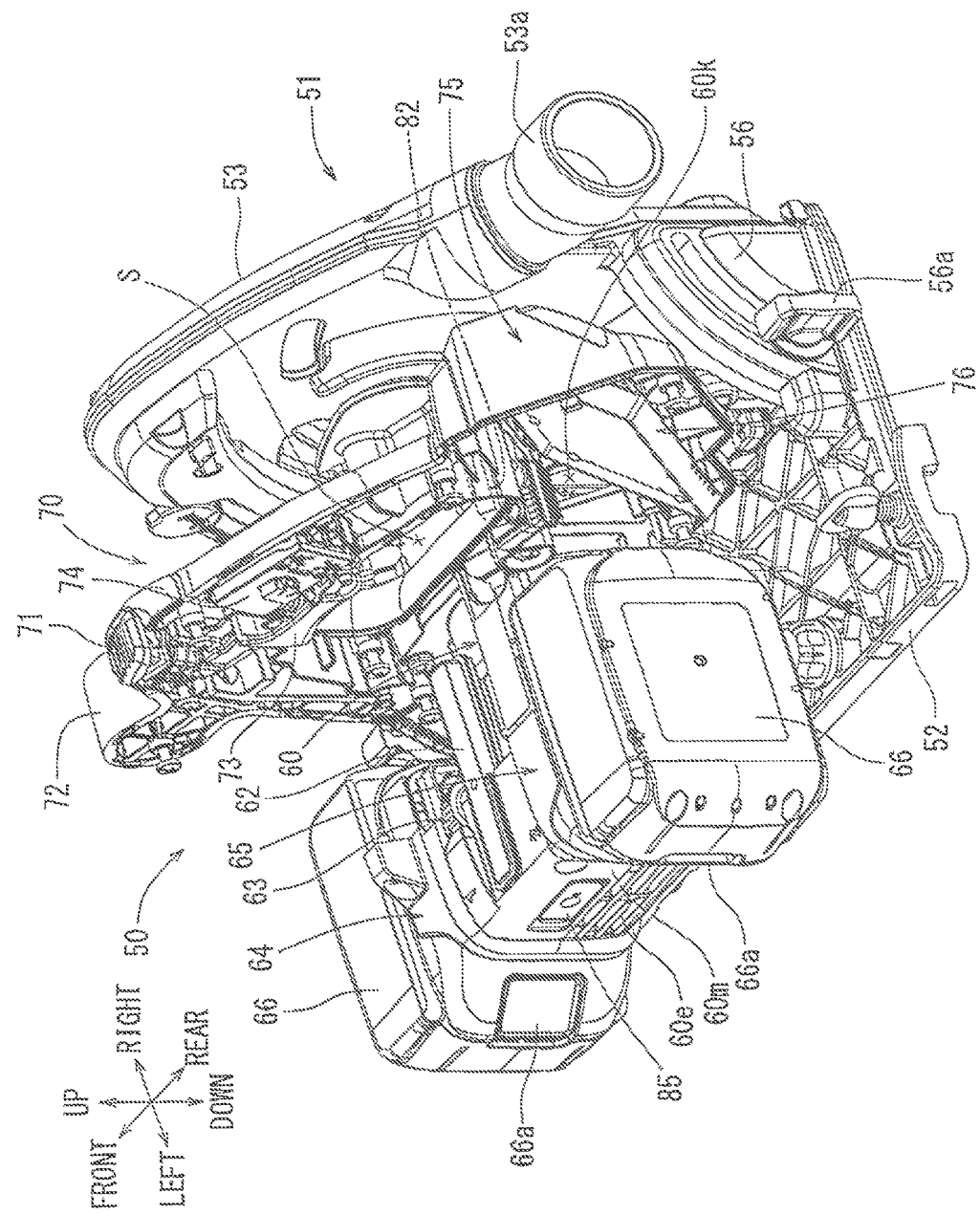
FIG. 12 is an overall perspective view of the portable machining device according to another embodiment (second embodiment), seen from a rear upper left. This figure shows that a left half-split housing of a handle as well as that of a controller housing is removed.

A cooling fan 60f may be attached to the motor shaft 60d. As shown in FIG. 11, a plurality of intake holes 60e may be provided on the left side of the motor case 60a. When the electric motor 60 is driven, the cooling fan 60f attached to the motor shaft 60d may rotate synchronously with the motor shaft 60d. Due to the rotation of the cooling fan 60f, outside air may be introduced into the motor case 60a via the intake holes 60e. Outside air which flows into the motor case 60a may flow in the rightward direction (in the direction of the motor axis J toward the cutting blade 54), cooling the stator 60b, the rotor 60c and the sensor PCB 60g, etc. A ventilation hole 60k may be provided on the motor case 60a on the lateral side of the cooling fan 60f (at the front/rear side of the fan 60f) as shown in FIG. 12. Outside air (motor cooling air) that has cooled the interior of the motor case 60a may flow into a controller housing 75 via the ventilation hole 60k. Outside air which flows into the controller housing 75 may be used for cooling the controller 76, which will be discussed in detail infra.

Rotation output of the electric motor 60 may be decreased through the reduction gear portion 58 and then transferred to the spindle 59. The spindle 59 may protrude into the interior of the cutting blade cover 53 through an arc-shaped insertion groove hole 53c provided on the left side of the cutting blade cover 53. Furthermore, a tip end of the spindle 59 protruding into the interior of the cutting blade cover 53 may be attached to the circular cutting blade 54. The center of rotation of the cutting blade 54 may be fixed by use of a cutting blade fixing screw 59a that can be firmly fastened and fixed to the tip end surface of the spindle 59. The spindle 59 may be rotatably supported by the gear case 58a via a right bearing 59b and a left bearing 59c.

As shown in FIG. 12, a battery attachment portion 64 may be provided on the front side of the motor case 60a. Similarly, a battery attachment portion 65 may be provided on the rear side of the motor case 60a. The battery attachment portions 64 and 65 may be used for attaching battery packs 66 at the front or back of the motor case 60a, respectively. FIG. 11 shows a state where the battery packs 66 are removed from the battery attachment portions 64 and 65. Each of the front battery attachment portion 64 and the rear battery attachment portion 65 may be configured such that a slide-attachment-type battery pack 66 can be attached thereto. In more detail, the front battery attachment portion 64 may be provided with a pair of upper and lower rails 64a. Furthermore, positive and negative battery terminals may be arranged between the pair of upper and lower rails 64a. Similarly, the rear battery attachment portion 65 may be provided with a pair of upper and lower rails 65a, and positive and negative battery terminals may be arranged between the pair of upper and lower rails 65a. The battery packs 66 may be attached by being slid into each of the front and rear battery attachment portions 64 and 65, respectively, in the rightward direction. On the contrary, the battery pack 66 may be detached from each of the front and rear battery attachment portions 64 and 65 by being slid in the leftward direction while a removal button 66a provided on the left end of the battery pack 66 is concomitantly pressed.

A lithium ion battery may be used as the battery pack 66 in which a plurality of lithium ion battery cells are housed in a battery case having an approximately hexahedral shape. The battery pack 66 may be highly versatile such that it can be attached to other electric power tools, other than the portable machining device 50. By sliding the hexahedrally-shaped battery pack 66 in the direction of the motor axis J toward and away from the cutting blade 54, the battery pack 66 can be attached to and removed from each of the battery attachment portions 64 and 65, respectively. When the battery packs 66 are removed from the battery attachment portions 64 and 65, they can be recharged by a dedicated battery charge, such that they can be repeatedly used.

Figure 7:
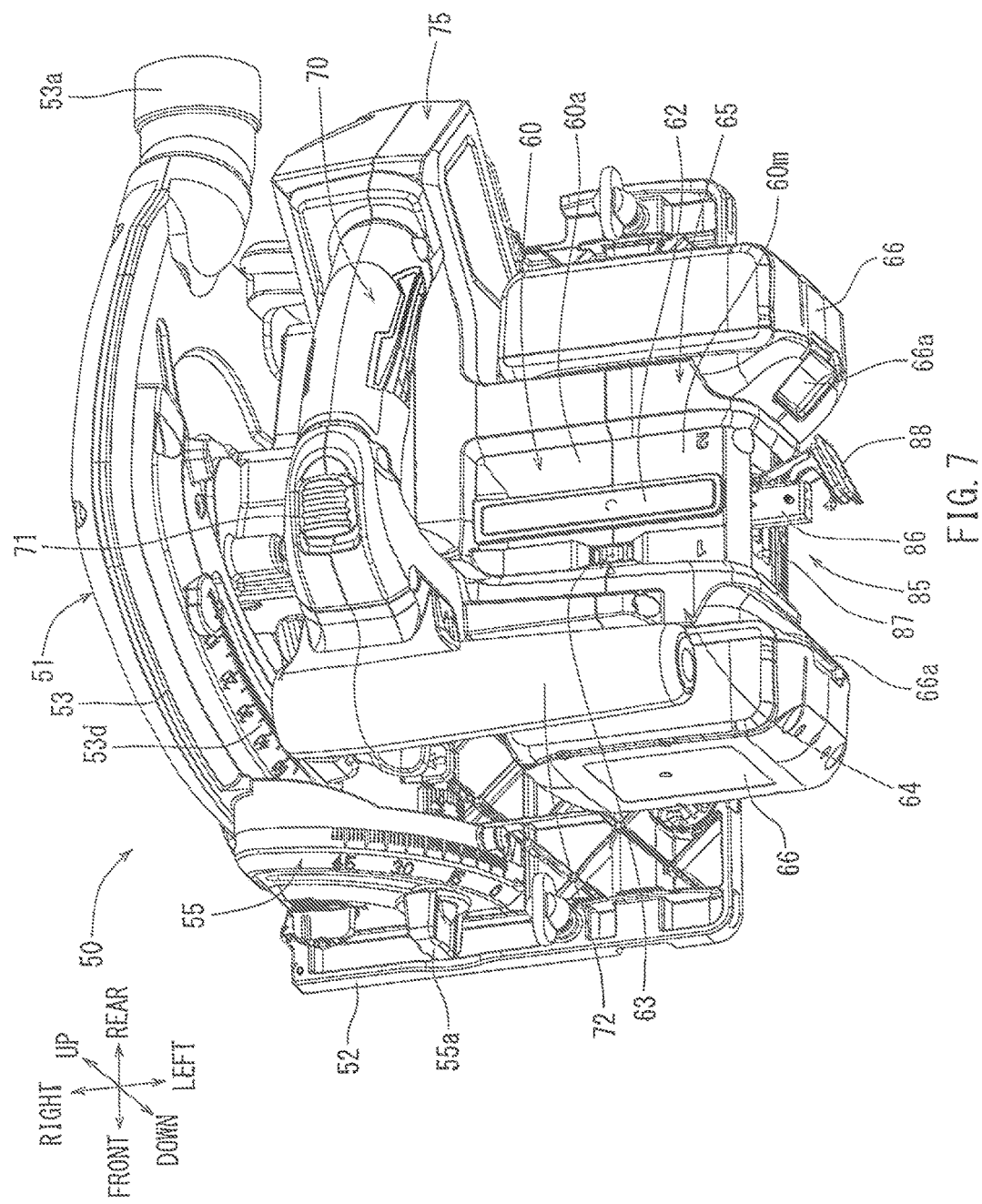
FIG. 7 is an overall perspective view of the portable machining device according to another embodiment (second embodiment), seen from a upper left.

As shown in FIGS. 7 and 12, a residual capacity display portion 62 for showing residual capacity of the battery backs 66 and a variable speed dial 63 for finely adjusting a rotational speed of the electric motor 60 may be provided on the upper surface of the motor case 60a.

As shown in FIG. 12, a controller housing 75 may be provided on the right side of the rear battery attachment portion 65 at the rear of the electric motor 60. The controller housing 75 may have a box shape extending from the rear of the motor case 60a in the rearward direction. As shown in FIG. 11, the controller housing 75 may be configured such that when the machining device main body 51 is positioned at its upper end position, the controller housing 75 extends approximately horizontally from the rear of the motor case 60a in the rearward direction along and to the rear of the upper rearmost surface of the base 52. Because of this configuration, as shown in FIG. 8, when the machining device main body 51 is moved to the lower end position, the rear side of the controller housing 75 may be directed counterclockwise upward and forward in a tilting manner in the upward direction. A controller 76 for mainly controlling the electric motor 60 may be housed in the controller housing 75. In the present embodiment, features as to the position of the controller 76 in the controller housing 75 are devised, which will be discussed in more detail infra.

The handle 70 that the user holds may have a loop shape straddling the upper portion of the motor case 60a of the electric motor 60 as well as the rear upper surface of the controller housing 75. A front portion of the handle 70 may be joined to the upper surface of the motor case 60a and a rear portion of the handle 70 may be joined to the rear upper surface of the controller housing 75. An inner circumference of the handle 70 having the loop shape may have a sufficient space (holding area S) in a manner such that the user can insert their hand into the area so as to grip/hold the handle 70. A trigger-type switch lever 73 which may be pulled inwards by a user's fingertips may be provided on the underside of the inner periphery of the handle 70. As shown in FIG. 11, a main switch 74 may be housed in the handle 70 at the rear of the switch lever 73 in a pulling direction of the switch lever 73. When the switch lever 73 is pulled, the main switch 74 may be switched on, starting to drive the electric motor 60. When the electric motor runs, the cutting blade 54 may begin to rotate.

Figure 10:
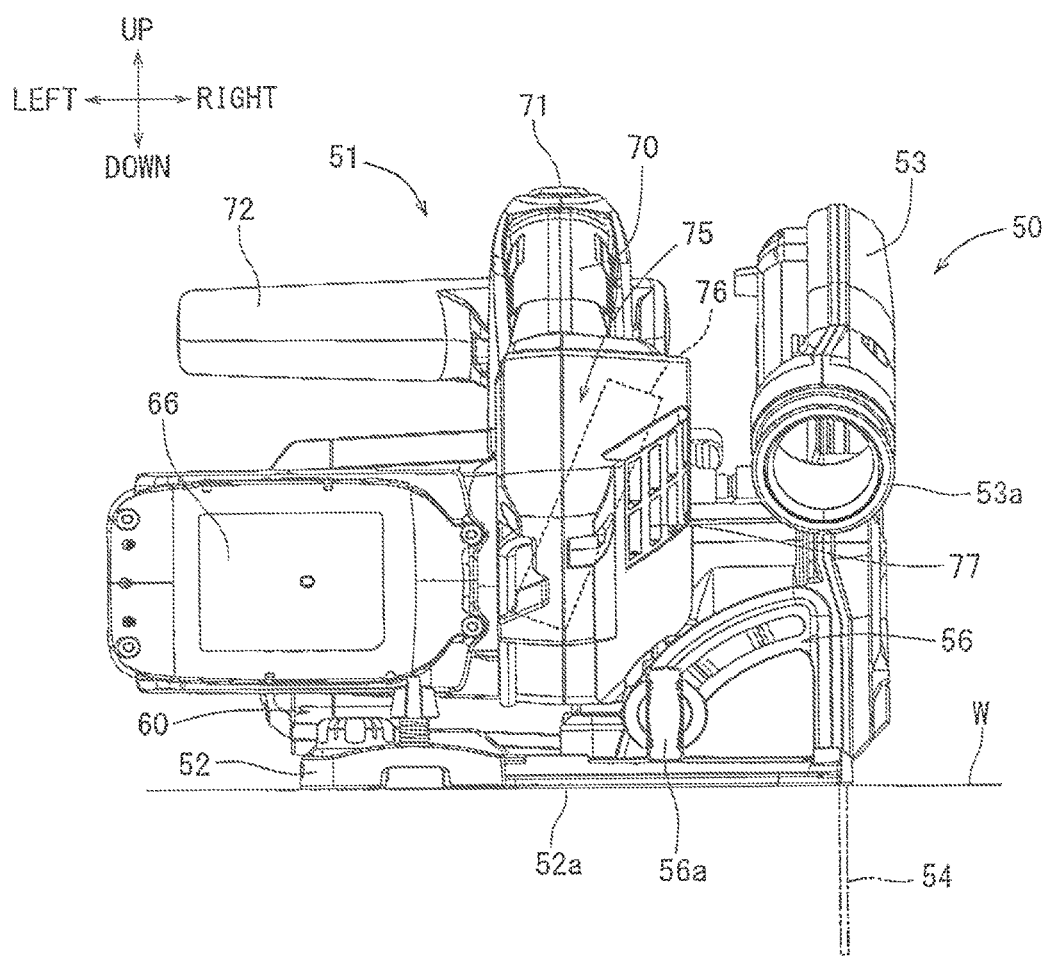
FIG. 10 is a rear side view of a portable machining device according to another exemplary embodiment (second embodiment).

A front grip 72 may be provided at the front portion of the handle 70. As shown in FIGS. 7, 9 and 10, the front grip 72 may extend from the front portion of the handle 70 in the leftward direction. The user can easily move and operate the portable machining device 50 in a more stable manner by holding the handle 70 with one hand and the front grip 72 with another hand. A lock off lever 71 may be provided on the upper surface of the handle 70. When the lock off lever 71 is not in a forward position, the switch lever 73 may be locked in an off position so as to not be able to be pulled. In contrast, when the lock off lever 71 is slid to the forward position with, for example, a thumb of the user's hand that holds the handle 70, the switch lever 73 may be able to be pulled inwards by the user's fingertips.

The controller 76 may have a rectangular plate shape and may house a control circuit board in a case having a shallow bottom. The interior of the case may be resin molded. The controller 76 may include a control circuit for mainly controlling the electric motor 60 and a power supply circuit. In more detail, the control circuit may include a microprocessor that transmits a control signal based on positional information of the rotor 60c that is detected by the sensor PCB 60g of the electric motor 60. Furthermore, the controller 76 may also include a drive circuit composed of FETs that switches the current of the electric motor 60 based on the control signal received from the control circuit. Furthermore, the controller 76 may also include an auto-stop circuit that interrupts power supply to the electric motor 60 based on a detection result from the battery pack 66 in order to prevent over-discharging and over-current conditions.

As shown in FIG. 11, the rectangular flat-shaped controller 76 may be housed in the controller housing 75 in a tiltable manner mainly in the left-to-right direction. As shown in FIG. 11, in the present embodiment, when the machining device main body 51 is moved to its upper end position, the controller 76 may be situated so as to be fixed approximately horizontal in the front-to-rear direction but tiltable in the left-to-right direction such that the top portion of the controller 76 may approach the side of the cutting blade 54 (in a direction in which the controller 76 is tilted toward the rightward direction from a right angle with regard to the base 52). Because of this configuration, as shown in FIG. 12, when the machining device main body 51 is moved to its lower end position, the controller 76 may be tilted in the front-to-rear direction as well as in the left-to-right direction.

Furthermore, when the machining device main body 51 is moved to its lower end position, the entirety of the controller 76 may be situated to be offset rearwards from a location where the handle 70 (the holding area S) extends in the front-to-rear direction. In this way, the controller 76 may be arranged to be tiltable in the front-to-rear direction as well as in the left-to-right direction and in the up-to-down-direction without interference. In other words, the controller 76 may be tilted in a compound manner. Because of this configuration, the height of the handle 70 may be restricted and at the same time sufficient holding space (holding capability) can be obtained.

Furthermore, the machining device main body 51 may be supported so as to be swung in the up-to-down direction about the main body support shaft 57 (swing fulcrum) that is located to the rear of the center of rotation of the cutting blade 54 (to the rear of the spindle 59). Furthermore, the controller 76 may be arranged to be offset in the rearward direction with respect to the main body support shaft 57. Because of this configuration, as shown in FIG. 8, when the protruding length of the cutting blade 54 protruding below the lower surface of the base 52 is at its maximum, the controller 76 may be tilted about the main body support shaft 57 so as to be displaced counterclockwise in the forward and upward direction as seen from the side view of FIG. 8. Because of this configuration, the space for housing the controller 76 (controller housing 75) can be made to be compact in the front-to-rear direction. Furthermore, while being compact, interference of the controller housing 75 or the controller 76 with respect to the base 52 is avoided, and also the machining device main body 51 is maneuverable to be swung to a larger angle in the upward or left-to-right direction to decrease the protruding length of the cutting blade 54 protruding below the lower surface of the base 54.

Furthermore, the holding area S for inserting the user's hand to hold the handle 70 may be arranged surrounding the handle 70 (mainly around the underside of the lower periphery of the handle 70). The controller 76 may be housed in the controller housing 75 in a tiltable manner such that the front portion of the controller 76 may overlap with the holding area S in the front-to-rear direction and the rear portion of the controller 76 may overlap with the holding area S in the up-to-down direction. Because of this configuration, a necessary and sufficient holding area S to hold the handle 70 (for obtaining a sufficient holding capability of the handle 70) can be obtained, while at the same time the controller 76 can be arranged in a compact and maneuverable manner.

The machining device main body 51 may be supported so as to be tiltable with respect to the base 52 via the front support portion 55 and the rear support portion 56. As shown in FIG. 10, when the machining device main body 51 is situated at a right angle position with respect to the base 52, the controller 76 may be placed in a tilted manner in the controller housing 75 so as to be displaced in a direction approaching the cutting blade 54 (in the rightward direction) from the down-to-up viewing direction as seen from the rear view of FIG. 10. Because of this arrangement of the controller 76, the controller housing 75 can be made to be compact in the left-to-right direction. Furthermore, as shown in FIG. 13, when the machining device main body 51 is tilted in the rightward direction, interference of the controller housing 75 with respect to the base 52 can be avoided and thus this compact configuration enables the machining device main body 51 to be tilted at a larger angle in the rightward direction.

Furthermore, as shown in FIG. 8, when the protruding length of the cutting blade 54 protruding below the lower surface of the base 52 is at its maximum, each of the battery packs 66 may be respectively disposed at the front and the rear, respectively, of the electric motor 60 below the holding area S of the handle 70. Because of this configuration, when the user holds the handle 70, the battery packs 66 do not interfere with the user's operation.

As shown in FIGS. 9 and 12, the interior of the controller housing 75 may be in fluid communication with the interior of the motor case 60*a* of the electric motor 60 through the ventilation hole 60*k* provided adjacent to the cooling fan 60*f*. Because of this configuration, the motor cooling air may flow into the interior of the controller housing 75 through the ventilation hole 60*k*. The motor cooling air passing through the ventilation hole 60*k* may be blown out to the controller 76, which can cool the controller 76. The motor cooling air that has cooled the controller 76 may be further discharged to the outside through an exhaust hole 77 provided on the right side of the controller housing 75, as shown in FIG. 10. In this way, the controller 76 in which heat generation sources such as switching elements are mounted can be efficiently cooled by use of sourcing the motor cooling air from the cooling fan 60*f*.

In the second embodiment, a rear cover 60*m* may be provided on the left side of the motor case 60*a*. A radio communication unit 85 may be provided on the inside of the rear cover 60*m*. A communication adapter 86 may be attached to the radio communication unit 85. An adapter insertion portion 87 for inserting the communication adapter 86 may be provided on the left end surface of the rear cover 60*m*. The adapter insertion portion 87 may comprise a rectangular hole and penetrate deep in the rightward direction in the motor case 60*a* along below the residual capacity display portion 62. As shown in FIG. 9, an adapter receiving portion 89 may be incorporated at the innermost part of the adapter insertion portion 87. By inserting the communication adapter 87 into the adapter insertion portion 86 to connect to the adapter receiving portion 89, the radio communication unit 85 may be able to conduct radio communication between the portable machining device 50 and an incidental device such as the dust collector 80 via the communication adapter 86. The adapter insertion portion 87 may be covered by a cap 88. By inserting the communication adapter 86 into the adapter insertion portion 87 and closing the cap 88, the communication adapter 86 and the adapter receiving portion 89 may be shielded against dust, in a dustproof configuration.

The communication adapter 86 may have been previously associated (paired) with a communication adapter of the specific incidental device such as the dust collector 50 such that radio communication can be performed between the two can take place. In a state where the communication adapter 86 is attached to the radio communication unit 85, when the switch lever 73 is switched on to run (start) the portable machining device 50, the start information from the portable machining device 50 may be transmitted through radio communication to the side of the dust collector 80, based on which the dust collector 80 may automatically run. As shown in FIG. 8, by attaching a dust collection hose 81 to the dust collection port 53*a*, the dust collector 80 may be an incidental device of the portable machining device 50, and the dust collector 80 may be in a standby state when powered on. As shown in FIGS. 11 and 12, in the second embodiment, a controller 82 for controlling the radio communication unit 85 may be housed at a rear portion of the handle 70. In the second embodiment, the controller 82 may be housed at the rearmost portion of the handle 70, within the interior of the handle 70, on the upper side of the controller housing 75. Because of this configuration, due to the flow path of the air flowing in the motor case 60*a* towards the controller housing 75, the controller 82 for controlling the radio communication unit 85 as well as the controller 76 for controlling the electric motor 60 can be cooled by said air.

As discussed above, the portable machining device 50 may be provided with a radio communication function to communicate with the dust collector 80 as an incidental device with regard to, mainly, start and stop operations. Accordingly, the dust collector 80 may automatically start/stop in accordance with a start/stop operation of the portable machining device 50, which can furthermore improve operability and workability of both the portable machining device 50 and the dust collector 80.

According to the portable machining device 50 of the second embodiment as discussed above, the communication adapter 86, which is previously associated (paired) with the dust collector 80 serving as the incidental device with regard to the start/stop operation thereof, may be configured to be removably housed into the interior of the left end portion of the electric motor 60. Because of this configuration, the dustproof ability as well as convenience of the communication adapter 86 can be improved. When there is no need to perform the radio communication with the dust collector 80, the communication adapter 86 can be easily removed from the portable machining device 1. In this respect, communication adapter 86 improves convenience for the user.

Furthermore, the radio communication unit 85 may be provided in close proximity of the electric motor 60 on the left end side of the electric motor 60. Because of this configuration, information about start/stop status of the electric motor 60 etc. can be accurately and rapidly communicated between the dust collector 80 and the communication adapter 86 as opposed to the case where the radio communication unit is elsewhere and does not receive the information properly. In this respect, reliability of the radio communication unit 85 is improved.

Furthermore, the communication adapter 86 may be configured to be removed from the adapter insertion portion 87 by being moved away from the cutting blade 11 in the leftward direction as shown by the void arrow showing the detaching direction in FIG. 1. Because of this configuration, attaching and detaching operability of the communication adapter 86 can be improved.

According to the portable machining device 50 of the second embodiment as discussed above, the controller 76 having the rectangular flat-plate shape may be arranged at the rear of the electric motor 60 and at the same time to be offset in the rearward direction with respect to the holding area S of the handle 70. Because of this configuration of the controller 76, sufficient holding area S (holding capability) can be obtained and at the same time the height of the handle 70 may be restricted.

Furthermore, according to the portable machining device 50 of the second embodiment, the controller 76 may be housed in the controller housing 75 in a compound tilting manner so as to be tilted concomitantly in the front-to-rear direction, in the up-to-down direction and in the left-to-right direction. Because of this configuration of the controller 76, the controller housing 75 can be made to be compact and as a result interference of the controller housing 75 with respect to the base 52 can be avoided, and thus the machining device main body 51 is able to be swung at a greater range of angles in the up-to-down left-to-right directions.

The first and second embodiments discussed above may be further modified without departing from the scope and spirit of the present teachings. In the first embodiment, the radio communication unit 30, used for conducting radio communication with the dust collector 40 which serves as the incidental device, may be positioned at the front region of the handle 20, within its interior. In the second embodiment, the radio communication unit 85 may be positioned on the left end side of the electric motor 60. Alternatively, the radio communication unit can also be positioned at other locations. For example, in the portable machining device 50 of the second embodiment, which is referred to as a plunge circular saw, the radio communication unit can be positioned at a location other than on the left end side of the electric motor 60 (a third embodiment).

FIG. 6 shows a plunge circular saw in which a plurality of locations suitable for positioning the radio communication unit (in a third embodiment) are shown in two-dot chain lines. As shown in FIG. 6, the radio communication unit 90 can be positioned at the front of the handle 70 within its interior. Further alternatively, the radio communication unit 91 may also be positioned within the front grip 72. In a case where the radio communication unit 90 or 91 is positioned at the front of the handle 70 or the front grip 72, respectively, the corresponding radio communication unit 90 or 91 may need to be positioned on the left side of the handle 70 or the front grip 72 (on a side opposite to the cutting blade 11 in the left-to-right direction) such that a removal direction of the radio communication unit 90 or 91 is configured to be leftward in the detaching direction by the void arrow in FIG. 1, in order to not interfere with the cutting blade cover 53. With this arrangement, ease of maneuverability in attaching and detaching the communication adapter can be improved.

Furthermore, as shown by the two-dot chain lines at the bottom rear region of FIG. 6 and referring to FIG. 7, the radio communication unit 92 may be positioned on the left side of the controller housing 75, or the radio communication unit 93 may be positioned on the rear side of the controller housing 75. By arranging the radio communication unit 92 or 93 in the controller housing 75 such that the communication adapter may be removably attached to the respective radio communication unit 92, 93, with the respective cap as described, high dust-proofing ability and cooling ability of the controller 76 may be achieved.

In the above-discussed embodiments, cutting devices such as the portable circular saw, the dust-proofing circular saw or the plunge circular saw are exemplified as the portable machining devices. Furthermore, the exemplified radio communication unit may be widely applied to other machining tools as well, such as aluminum groove-cutting tools, etc.

Figure 14:
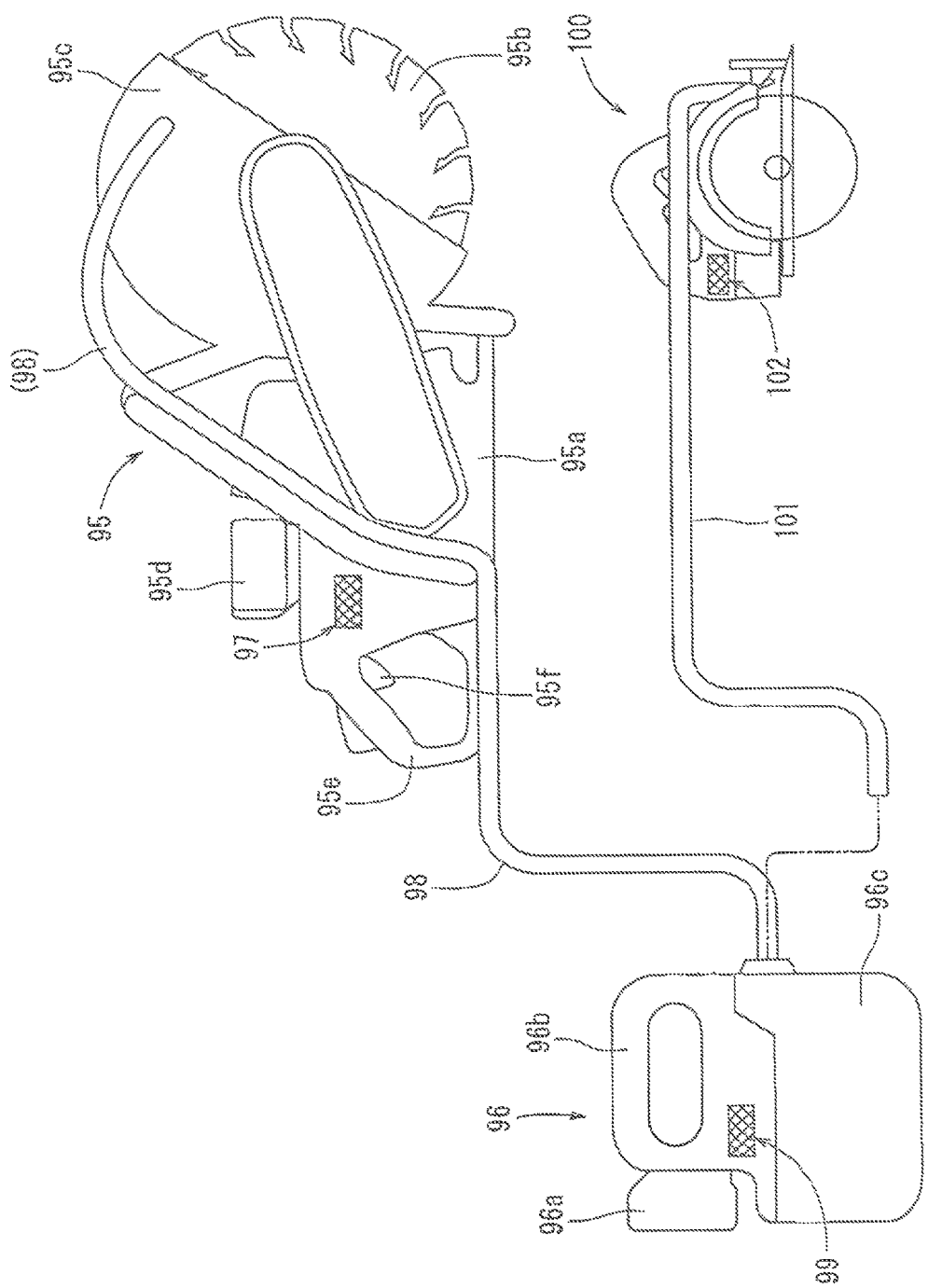
FIG. 14 is a schematic side view of a portable machining device and an incidental device according to another exemplary embodiment (fourth embodiment), showing two portable machining devices.

Furthermore, instead of the exemplified dust collector 40, for example, as shown in FIG. 14, a water injection device 96 may be used as the incidental device that operates synchronously with the portable machining device via radio communication. FIG. 14 shows a fourth embodiment in which an electric cutter is shown as the portable machining device 95. The portable machining device 95 of the fourth embodiment may be provided with a tool main body 95a that houses an electric motor. A circular cutter 95b and a semi-circular cover 95c may be provided on the front side of the tool main body 95a. A battery pack 95d serving as a power source may be attached to the upper portion of the tool main body 95a. A loop-shaped handle 95e that the user holds may be provided at the rear of the tool main body 95a. A pullable switch lever 95f may be provided at the upper portion of the inner circumference of the handle 95c. When the switch lever 95f is pulled by the fingertips of the user's hand, the electric motor that is housed in the tool main body 95a may be driven, rotating cutter 95b. A radio communication unit 97 may be provided on the front side of the handle 95e below the battery pack 95d. A communication adapter may be attached to the radio communication unit 97.

The water injection device 96 may be a discharge pump that can be activated by a battery pack 96a as a power source, and may be connected to the cover 950 of the portable machining device 95 via an injection hose 98. The water injection device 96 may be provided with a handle 96b on the upper thereof that the user holds. The water injection device 96 may be provided with an injection tank 96c at the bottom. Furthermore, the water injection device 96 may be provided with a radio communication unit 99 in the vicinity of the battery pack 96a below the handle 96b. A communication adapter may be attached to the radio communication unit 99. The other communication adapter that is attached to the radio communication unit 97 of the portable machining device 95 may have been previously associated (paired) with the communication adapter that is attached to the radio communication unit 99 of the water injection device 96.

When the switch lever 95f is pulled by the fingertips of a user's hand to run the portable machining device 95, a starting signal may be emitted from the communication adapter of the radio communication unit 97. The communication adapter on the water injection device 96 may receive the emitted starting signal via radio communication conducted by the two radio communication units between portable machining device 95 and water injection device 96 to automatically run the water injection device 96. When the water injection device 96 runs, water may be supplied through the injection hose 98 to the cutter 95*b* from within the cover 95*c*. By supplying water toward the cutter 95*b*, cutting dust generated at the cutting of stone etc. can be prevented from scattering in the vicinity of the cutting site, and thus a safer working environment can be established. When the portable machining device 95 is stopped, similar to the start signal, a stop signal may be emitted from the communication adapter of the radio communication unit 97. The communication adapter on the water injection device 96 may receive the stop signal, via radio communication conducted by the two radio communication units between portable machining device 95 and water injection device 96, and then the water injection device 96 may stop. In this way, water supply to the cutter 95*b* may be automatically stopped.

As discussed above, in the portable machining device 95 of the fourth embodiment, incorporating the communication adapter for the radio communication into the interior of the machining device main body with an accompanying cap can improve the dust-proof ability of the device. Furthermore, by enabling the communication adapter to be removable from the radio communication unit 97, 99, the communication adapter can be easily removed therefrom to use another portable machining device when radio communication is not performed, enhancing versatility and interoperability of device components. In this respect, usability and flexibility of the communication adapter, and by consequence of the radio communication function or the portable machining device 95 and the water injection device 96, can be improved.

FIG. 14 also shows a portable circular saw as another portable machining device 100. The injection hose 98 may be removed from the water injection device 96 and instead another injection hose 101 of the portable machining device 100 may be connected to the water injection device 96. Furthermore, the communication adapter may be removed from the then used portable machining device 95 and the removed communication adapter may be inserted into a radio communication unit 102 of the portable machining device 100. Because of this arrangement, the portable machining device 100 can also operate synchronously with the water injection device 96 by the radio communication with respect to a start/stop operation, etc. In this way, the communication adapter that has been previously associated (paired) with the communication adapter of the incidental devices can be shared with a plurality of devices. Because of this shared communication adapter, low cost and multiple functions can be established with respect to a plurality of the portable machining devices.

What is claimed is:

1. A portable machining, device that is configured to perform a cutting task by moving in a cut proceeding direction, comprising:
    a base having a first surface configured to contact a material to be cut;
    a machining device main body which is supported above a second surface of the base, the second surface being opposite the first surface;
    an adapter device (1) configured to communicate with an incidental device of the portable machining device and (2) that is removably provided in an interior of the machining device main body; and
    a handle that is formed integrally with the machining device main body, wherein:
    the machining device main body includes a cutting blade that is rotated by an electric motor serving as a drive source, the cutting blade (1) being configured to protrude below the first surface of the base and (2) having opposite side surfaces;
    the incidental device is started and stopped via communications between the adapter device and the incidental device in a manner such that the incidental device operates synchronously with a start and stop operation of the portable machining device; and
    the adapter device is removed from the machining device main body by moving the adapter device transversely to the opposing side surfaces of the cutting blade away from the cutting blade.

2. The portable machining device according to claim 1, wherein the adapter device is disposed on a side of the electric motor opposite from the base.

3. The portable machining device according to claim 1, wherein the adapter device is disposed at a front portion of the handle with respect to the cut proceeding direction.

4. The portable machining device according to claim 1, wherein a controller configured to control communications by the adapter device is disposed on a side of electric motor opposite from the base.

5. The portable machining device according to claim 1, wherein the adapter device is disposed at a lateral side of the handle opposite from the cutting blade with respect to the cut proceeding direction on a side of the electric motor.

6. The portable machining device according to claim 1, wherein a controller configured to control communications by the adapter device is housed at a rear end portion of the handle with respect to the cut proceeding direction.

7. A portable machining device that is configured to perform a cutting task by moving in a cut proceeding direction, comprising:
    a base (1) with a rectangular flat plate shape and (2) having a first surface configured to contact a material to be cut;
    a machining device main body which is supported above a second surface of the base, the second surface being opposite the first surface; and
    a handle that is integrally formed with the machining device main body, wherein:
    the machining device main body includes a rotary cutting blade that is rotated by an electric motor serving as a drive source, the cutting blade being configured to protrude below a the first surface of the base;
    the machining device main body is configured to be swung in the up-to-down direction with respect to the cut proceeding direction about a swing fulcrum, such that a cutting depth of the cutting blade with respect to the base can be changed;
    the portable machining device further comprises a detachable adapter device configured to facilitate communications between the portable machining device and a remotely provided incidental device;
    the adapter device has a rectangular prismatic body and is provided to fit within the interior of the machining main body;
    the incidental device is started and stopped via communications between the adapter device and the incidental device in a manner such that the incidental device operates synchronously with a start and stop operation of the portable machining device; and the adapter device is removed from the machining device main body by moving the adapter device transversely to opposing side surfaces of the cutting blade away from the cutting blade.

8. The portable machining device according to claim 7, wherein the adapter device is disposed on a side of the electric motor opposite from the base.

9. The portable machining device of claim 8, wherein:
the adapter device is fit within a complementary rectangular shaped hole at a lateral side relative to the handle, spaced apart from the handle, on a side of the electric motor;
the hole has rounded edges; and
electrical sockets extend into the interior of the hole, to receive electrical connectors of the adapter device at an end of the adapter device on a side of the cutting blade, when the adapter device is fully inserted into the handle.

10. The portable machining device according to claim 7, wherein a controller configured to control communications by the adapter device is housed at a rear end portion of the handle with respect to the cut proceeding direction.

11. The portable machining device according to claim 10, wherein:
the portable machining device comprises a controller housing that houses a controller configured to control the electric motor and a cooling fan driven by the electric motor for introducing outside air via intake holes into a motor case; and
the motor case is in fluid communication with the controller housing such that the controller is cooled by the outside air serving as a motor cooling air.

12. The portable machining device of claim 9, wherein:
the handle comprises an affixed cap; and
when the adapter device is inserted into the hole, the cap may full cover the opening into which the adapter device has been inserted.

13. The portable machining device according to claim 7, wherein the adapter device is disposed within the interior of a front end portion of the handle with respect to the cut proceeding direction on an opposite side to the cutting blade, such that the adapter device may fully fit within the interior of the portable machining device.

14. The portable machining device of claim 13, wherein;
the adapter device is fit within a complementary rectangular shaped hole in the interior of the front end portion of the handle;
the hole has rounded edges; and
electrical sockets extend into the interior of the hole, to receive electrical connectors of the adapter device at an end of the adapter device on a side of the cutting blade, when the adapter device is fully inserted into the handle.

15. The portable machining device of claim 14, wherein:
the handle comprises an affixed cap; and
when the adapter device is inserted into the hole in the interior of the handle, the cap may fully cover the opening into which the adapter device has been inserted.

16. The portable machining device according to claim 7, wherein a controller for controlling radio configured to control communications by the adapter device is disposed on a side the electric motor opposite the base.

17. The portable machining device according to claim 7, wherein the adapter device is disposed at a lateral side relative to the handle opposite from the cutting blade with respect to the cut proceeding direction.

18. The portable machining device according to claim 11, wherein:
a trigger-type pullable switch lever is provided on an upper portion on an inner circumference of the handle with respect to the cut proceeding direction, such that the electric motor may be driven to rotate the cutter blade by the controller, when the switch lever and a lock-off lever above the switch lever within the interior of the handle are pulled and pressed, respectively, in a simultaneous manner; and
electrical circuitry of the device is comprised such that if the lock-off lever is not simultaneously pressed along with the switch lever being pulled, the electric motor is not driven.

* * * * *